United States Patent
Tada et al.

(10) Patent No.: US 7,986,604 B2
(45) Date of Patent: Jul. 26, 2011

(54) OPTICAL ELEMENT AND OPTICAL PICKUP DEVICE

(75) Inventors: Kazunari Tada, Hachioji (JP); Youichi Ogawa, Sakai (JP); Nobuo Mushiake, Osaka (JP); Kazuyuki Nishi, Sakai (JP)

(73) Assignee: Konica Minolta Opto, Inc., Tokyo (JP)

( * ) Notice: Subject to any disclaimer, the term of this patent is extended or adjusted under 35 U.S.C. 154(b) by 716 days.

(21) Appl. No.: 11/999,564

(22) Filed: Dec. 6, 2007

(65) Prior Publication Data

US 2008/0259773 A1    Oct. 23, 2008

(30) Foreign Application Priority Data

Dec. 7, 2006    (JP) .................................. 2006-330267

(51) Int. Cl.
G11B 7/00    (2006.01)
(52) U.S. Cl. .......... 369/112.01; 369/112.22; 369/112.23
(58) Field of Classification Search .............. 369/112.22
See application file for complete search history.

(56) References Cited

U.S. PATENT DOCUMENTS

| | | | | |
|---|---|---|---|---|
| 2004/0037204 A1* | 2/2004 | Takeuchi | .................. | 369/112.08 |
| 2004/0184167 A1* | 9/2004 | Nishi et al. | .................... | 359/831 |
| 2004/0213134 A1 | 10/2004 | Takada et al. | | |
| 2004/0264342 A1* | 12/2004 | Hirayama | ................ | 369/112.01 |
| 2005/0063282 A1 | 3/2005 | Takada et al. | | |
| 2005/0210922 A1 | 9/2005 | Tanaka et al. | | |
| 2005/0219643 A1 | 10/2005 | Hendriks et al. | | |
| 2006/0018234 A1* | 1/2006 | Sugi et al. | ................ | 369/112.01 |

FOREIGN PATENT DOCUMENTS

| | | |
|---|---|---|
| JP | 2001-318231 A | 11/2001 |
| JP | 2002-286989 A | 10/2002 |
| JP | 2005-190615 A | 7/2005 |
| WO | WO 03/060892 A2 | 7/2003 |
| WO | WO 2004/095444 A1 | 11/2004 |

OTHER PUBLICATIONS

Office Action and English-language translation thereof regarding corresponding Chinese patent application 2007800454962, Office Action mailed on Aug. 11, 2010, 13 total pages.

* cited by examiner

*Primary Examiner* — Lixi Chow
(74) *Attorney, Agent, or Firm* — Brinks Hofer Gilson & Lione

(57) ABSTRACT

An objective lens causes birefringence, which causes wave aberration in outgoing light from the objective lens. A coated objective lens has a dielectric multilayer film that can reduce astigmatism component of the wave aberration to 5 m$\lambda$ rms or smaller when 10 m$\lambda$ rms or larger astigmatism component of wave aberration is generated.

11 Claims, 33 Drawing Sheets

EXAMPLE 1

EXAMPLE 3

EXAMPLE 4

EXAMPLE 5

EXAMPLE 6

OPTICAL ELEMENT AND OPTICAL PICKUP DEVICE

This application is based on Japanese Patent Application No. 2006-330267 filed in Japan on Dec. 7, 2006, the contents of which are hereby incorporated by reference.

BACKGROUND OF THE INVENTION

1. Field of the Invention

The present invention relates to an optical element as a lens having a coated surface. The present invention also relates to an optical pickup device equipped with the optical element.

2. Description of Related Art

Conventionally, an optical pickup device is equipped with an objective lens (optical element) that condenses light from a laser diode onto an optical disc. Such an objective lens is made of a plastic material, a glass material or the like.

A molded objective lens may cause various aberrations (wave aberration) in outgoing light due to various factors, for example, tolerances of a lens surface or nonuniform distribution of the refractive index inside the lens. The various aberrations make a shape of a light spot formed on the optical disc different from a desired shape. Therefore, a shape error may occur between the deformed light spot and the desired light spot, which causes a phenomenon that data cannot be recorded on the optical disc stably, a phenomenon that data to be read from the optical disc cannot be reproduced correctly or other phenomena. Note that an objective lens corresponding to a blue color laser (having a wavelength of approximately 405 nm) to be with high accuracy is required to have the wave aberration below 10 m$\lambda$ rms, for example.

One of factors that causes nonuniform distribution of the refractive index inside the lens is glass molding. When an objective lens OL is manufactured by the glass molding, base material of melted glass GM is molded by pressure with a die MM (MM1 and MM2) having predetermined curved surfaces as shown in FIG. 4. Therefore, relatively large pressure is exerted on the outer edge of the objective lens OL, and the pressure causes stress strain inside the objective lens OL. As a result, birefringence occurs (the number of arrows in FIG. 4 shows pressure distribution). This birefringence is likely to occur in a lens having a large numerical aperture (e.g., numerical aperture of 0.6 or larger) with a large thickness difference between the middle portion and the outer edge portion of the lens.

As one method for preventing the phenomenon as described above, there is a method as described in US2005/210922A1, for example. According to this method, initial design value of the optical element is determined first based on a precondition that refractive index distribution inside it is uniform. Next, the optical element is modeled based on the initial design value, and refractive index distribution of the molded item (initial item) is measured.

Next, various aberrations due to the measured refractive index distribution (i.e., nonuniform refractive index distribution data) is determined by simulation. Then, aspheric surface shape data that enables correction of aberration in this simulation is determined, so that the die is corrected and processed to match the aspheric surface shape data. Then, the die after the correction and process is used for molding, so that aberration of the optical element can be reduced.

However, the optical element disclosed in US2005/210922A1 requires very difficult and burdensome correction and process of the die. In addition, such an optical element requires burdensome measurement of nonuniform refractive index distribution data.

SUMMARY OF THE INVENTION

In order to solve the problem described above, an object of the present invention is to provide an optical element that can easily suppress various aberrations (e.g., astigmatism component of wave aberration) of outgoing light and to provide an optical pickup device equipped with the optical element.

The optical element has an optical multilayer film formed on a surface of a lens. As for the optical element, the lens has birefringence. Astigmatism component of wave aberration due to the lens is 10 m$\lambda$ rms or larger. The optical multilayer film generates a phase difference between P-polarization and S-polarization, which cancels the birefringence, so that astigmatism component of wave aberration due to the optical element is reduced to 5 m$\lambda$ rms or smaller.

In addition, the optical element may have an optical multilayer film formed on a surface of a lens, in which the lens has birefringence, and the optical multilayer film generates a phase difference between P-polarization and S-polarization, which cancels the birefringence, so that the astigmatism component of wave aberration caused by the optical element is reduced to a half or smaller.

The object described above, other object and features of the present invention will be clear by referring the following description about the preferred examples and the attached drawings.

3

Figure 11:
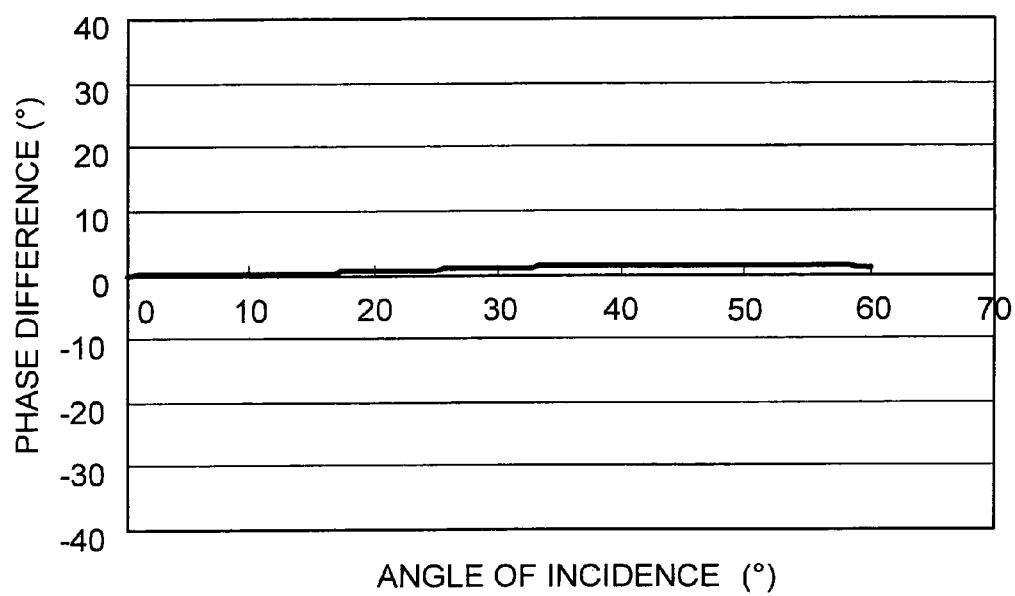

FIG. 11 is a phase difference characteristic graph showing the phase difference characteristic of the dielectric multilayer film according to the Example 2 (where, the wavelength is 660 nm).

Figure 12:
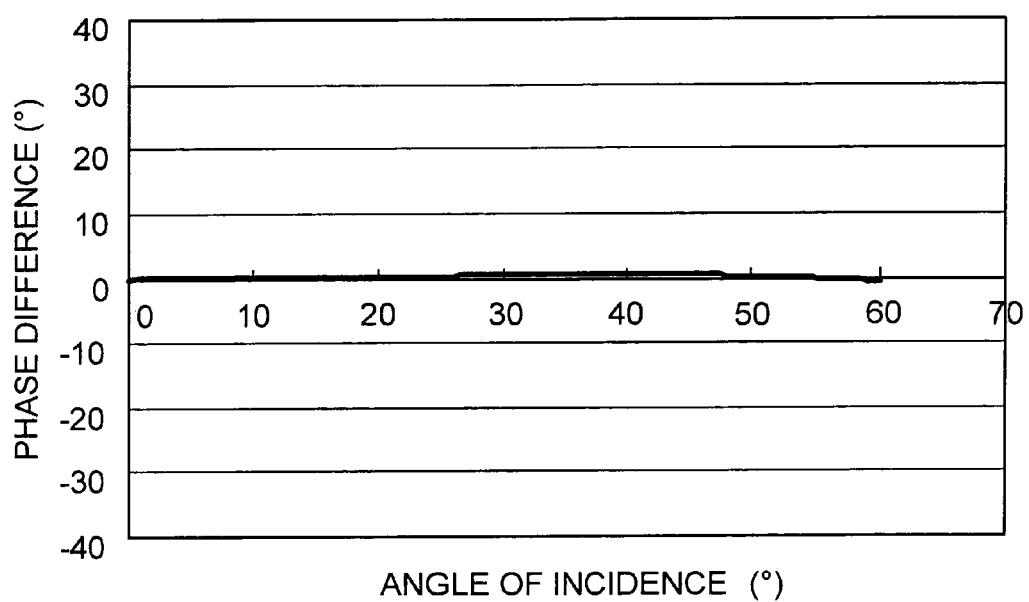

FIG. 12 is a phase difference characteristic graph showing the phase difference characteristic of the dielectric multilayer film according to the Example 2 (where, the wavelength is 785 nm).

Figure 13:
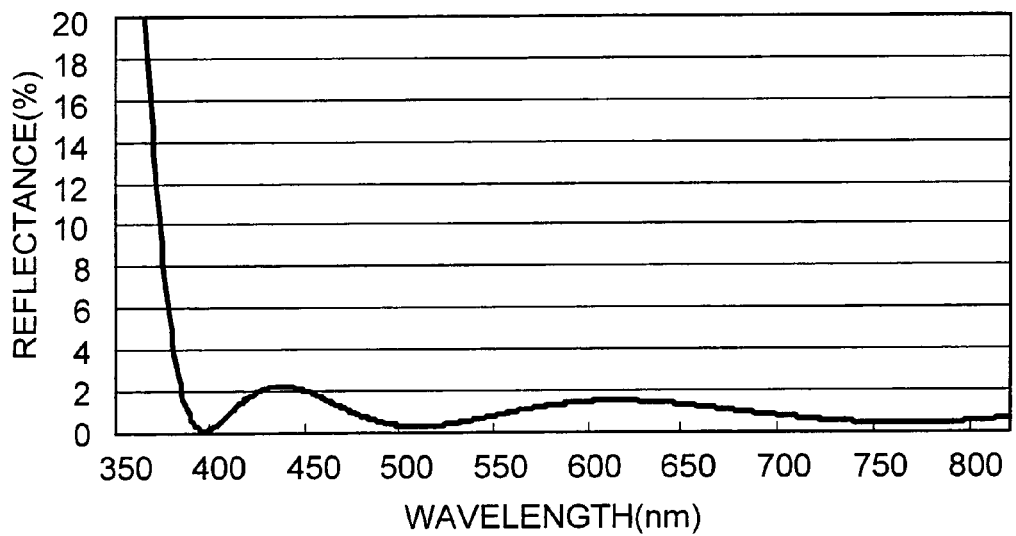

FIG. 13 is a reflection characteristic graph showing the reflection characteristic of a dielectric multilayer film according to an Example 3.

Figure 14:
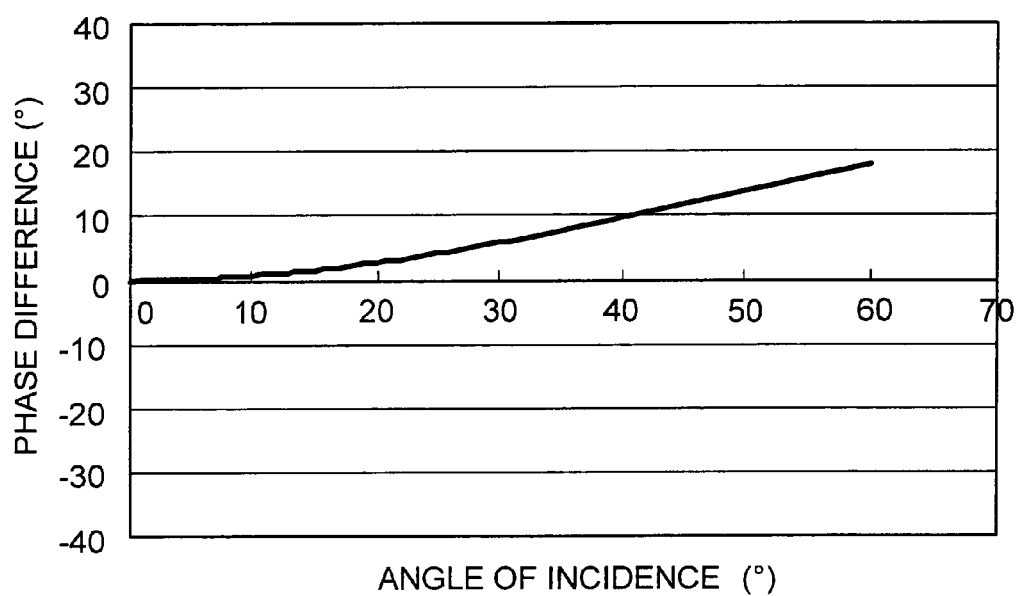

FIG. 14 is a phase difference characteristic graph showing the phase difference characteristic of the dielectric multilayer film according to the Example 3 (where, the wavelength is 405 nm).

Figure 15:
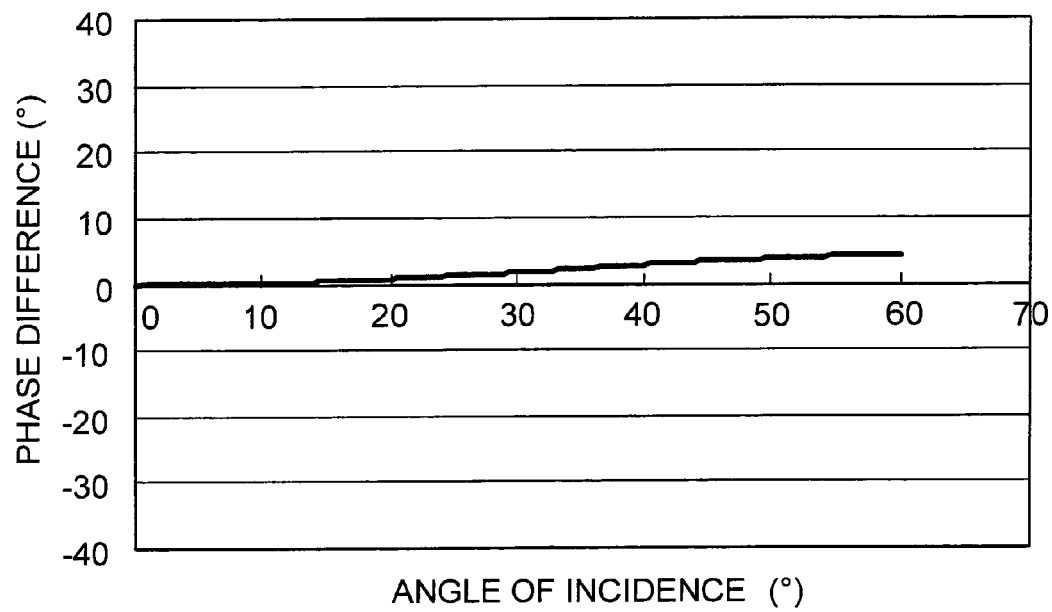

FIG. 15 is a phase difference characteristic graph showing the phase difference characteristic of the dielectric multilayer film according to the Example 3 (where, the wavelength is 660 nm).

Figure 16:
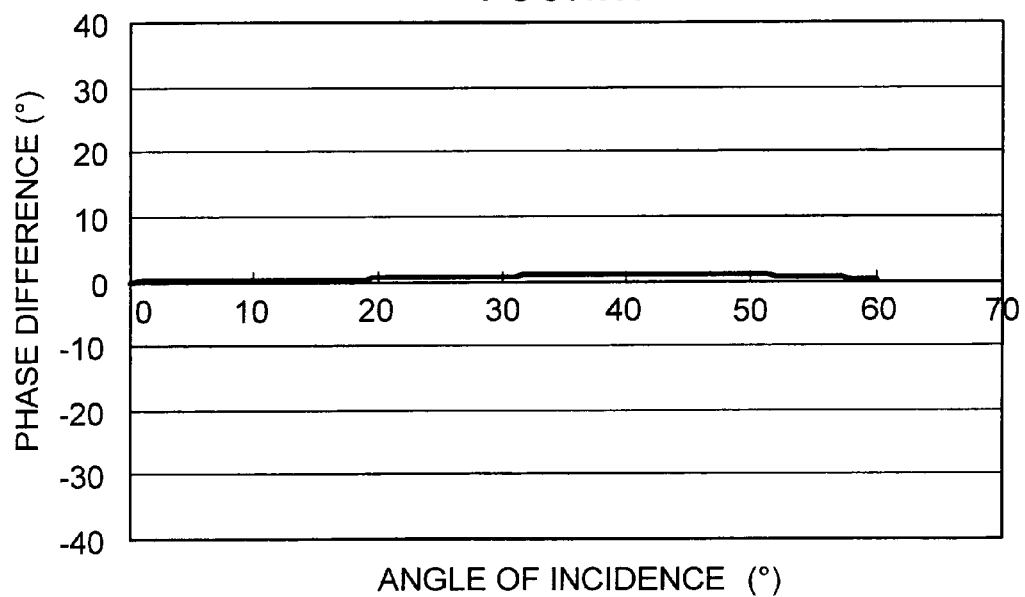

FIG. 16 is a phase difference characteristic graph showing the phase difference characteristic of the dielectric multilayer film according to the Example 3 (where, the wavelength is 785 nm).

Figure 17:
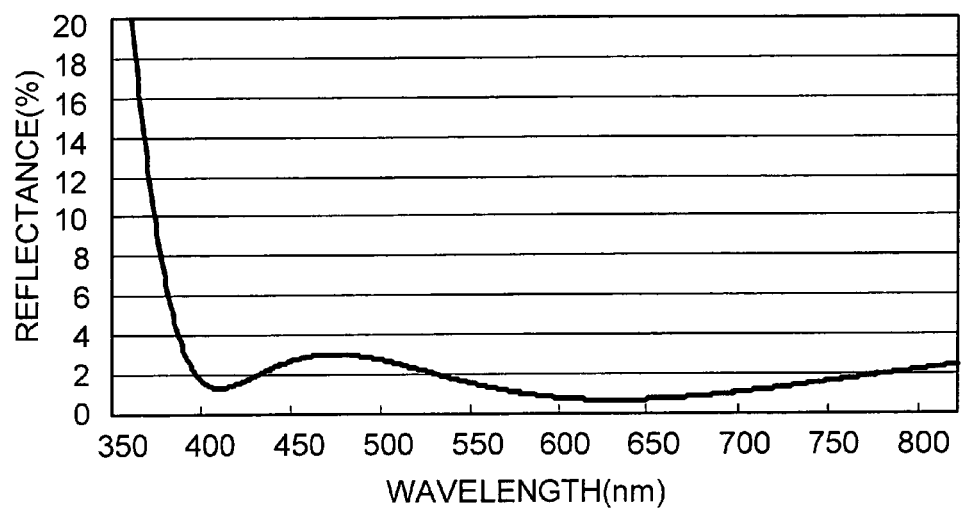

FIG. 17 is a reflection characteristic graph showing the reflection characteristic of a dielectric multilayer film according to an Example 4.

Figure 18:
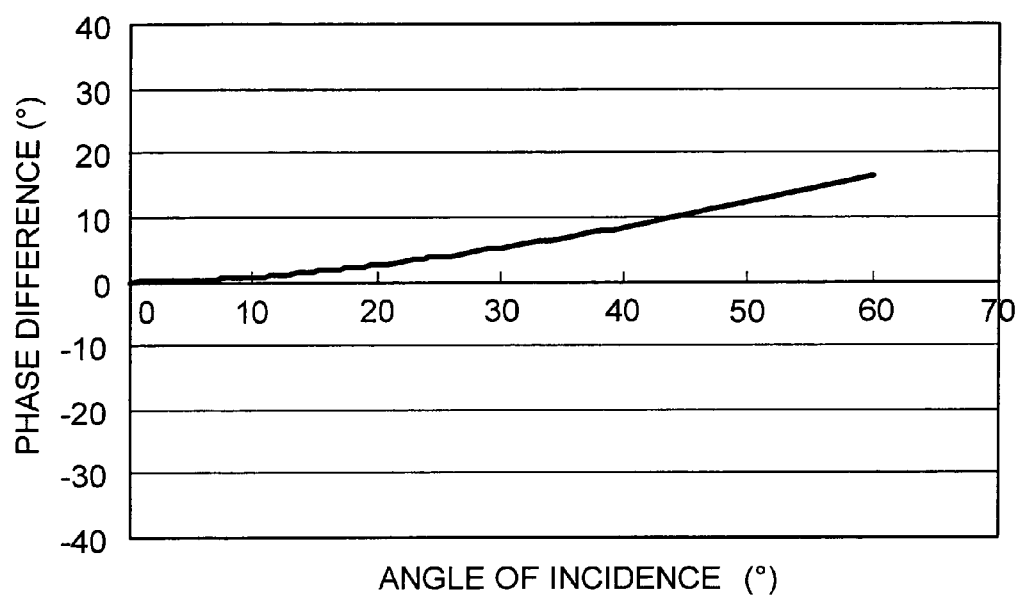

FIG. 18 is a phase difference characteristic graph showing the phase difference characteristic of the dielectric multilayer film according to the Example 4 (where, the wavelength is 405 nm).

Figure 19:
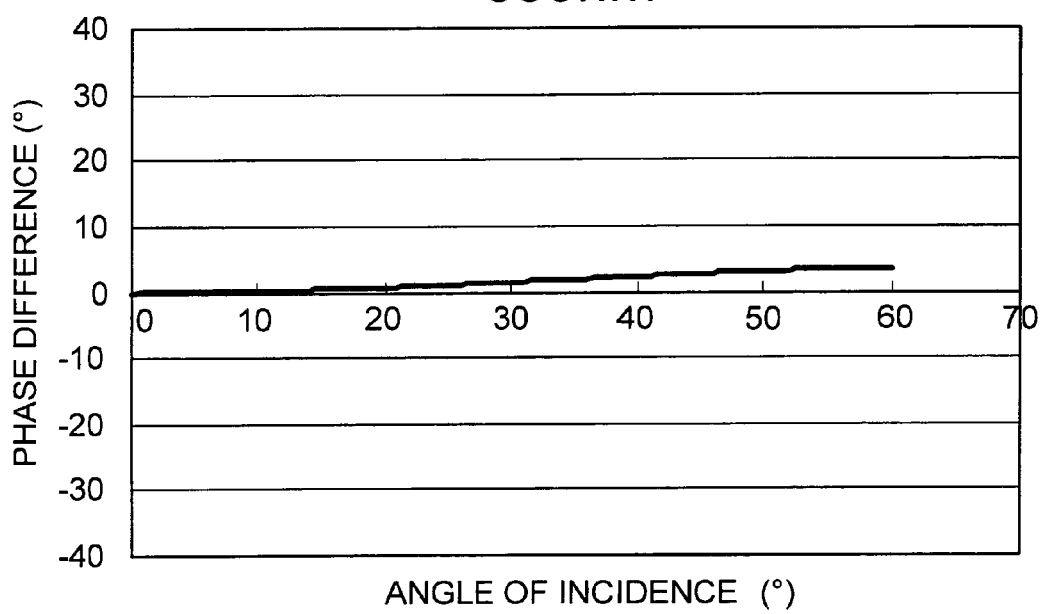

FIG. 19 is a phase difference characteristic graph showing the phase difference characteristic of the dielectric multilayer film according to the Example 4 (where, the wavelength is 660 nm).

Figure 20:
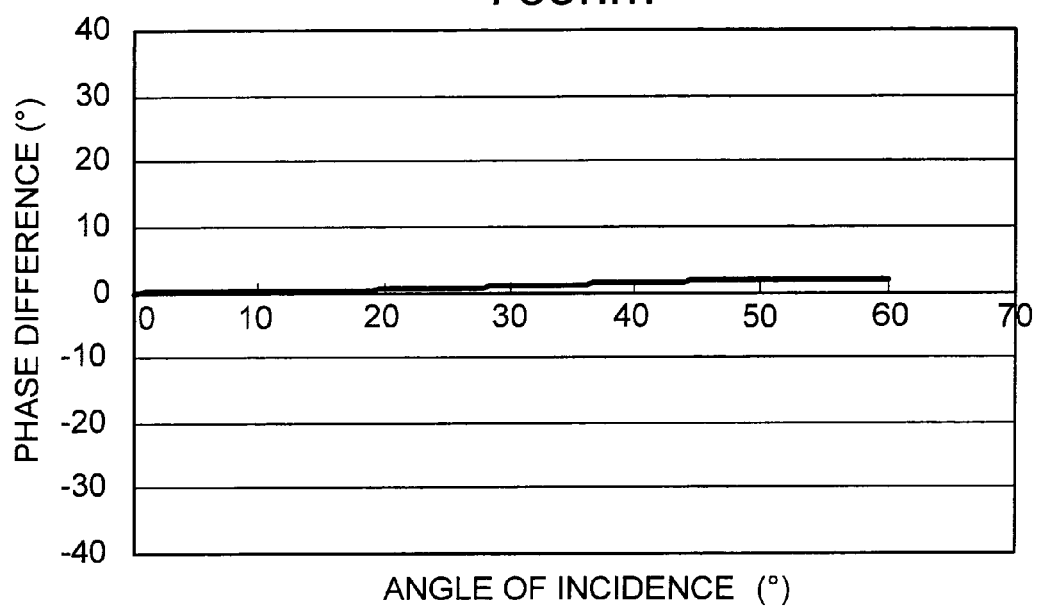

FIG. 20 is a phase difference characteristic graph showing the phase difference characteristic of the dielectric multilayer film according to the Example 4 (where, the wavelength is 785 nm).

Figure 21:
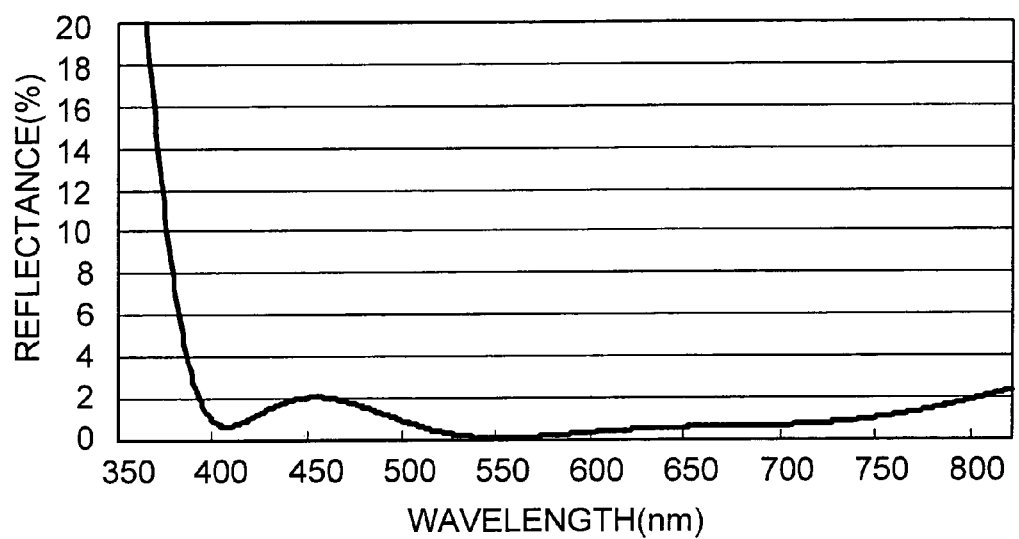

FIG. 21 is a reflection characteristic graph showing the reflection characteristic of a dielectric multilayer film according to an Example 5.

Figure 22:
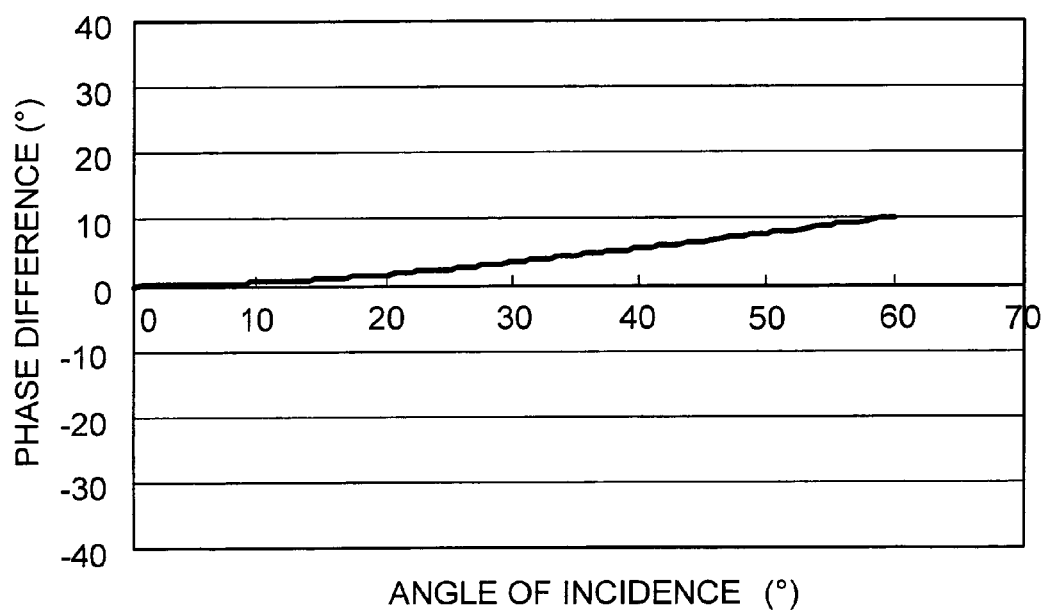

FIG. 22 is a phase difference characteristic graph showing the phase difference characteristic of the dielectric multilayer film according to the Example 5 (where, the wavelength is 405 nm).

Figure 23:
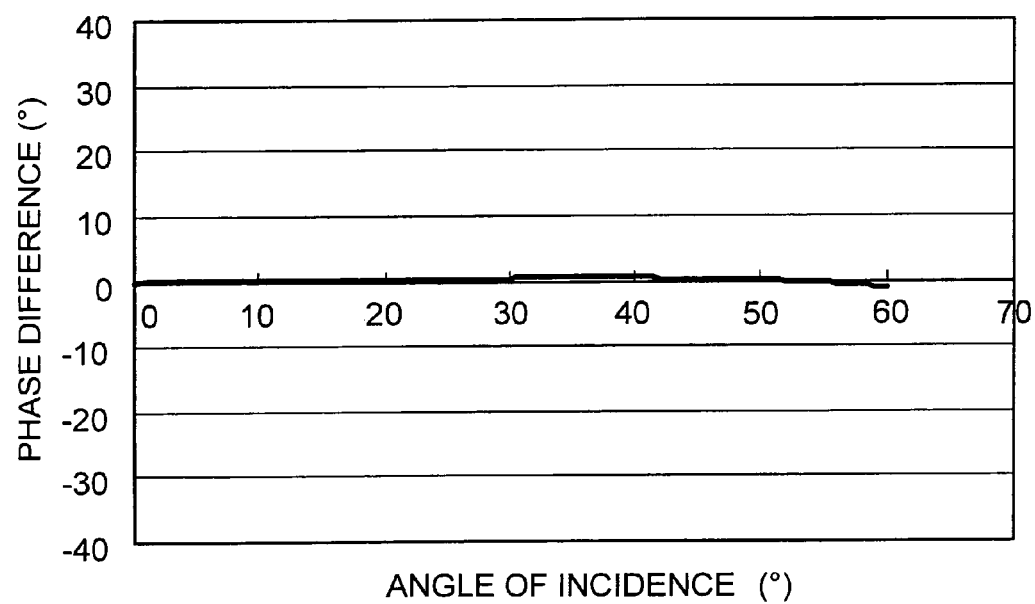

FIG. 23 is a phase difference characteristic graph showing the phase difference characteristic of the dielectric multilayer film according to the Example 5 (where, the wavelength is 660 nm).

Figure 24:
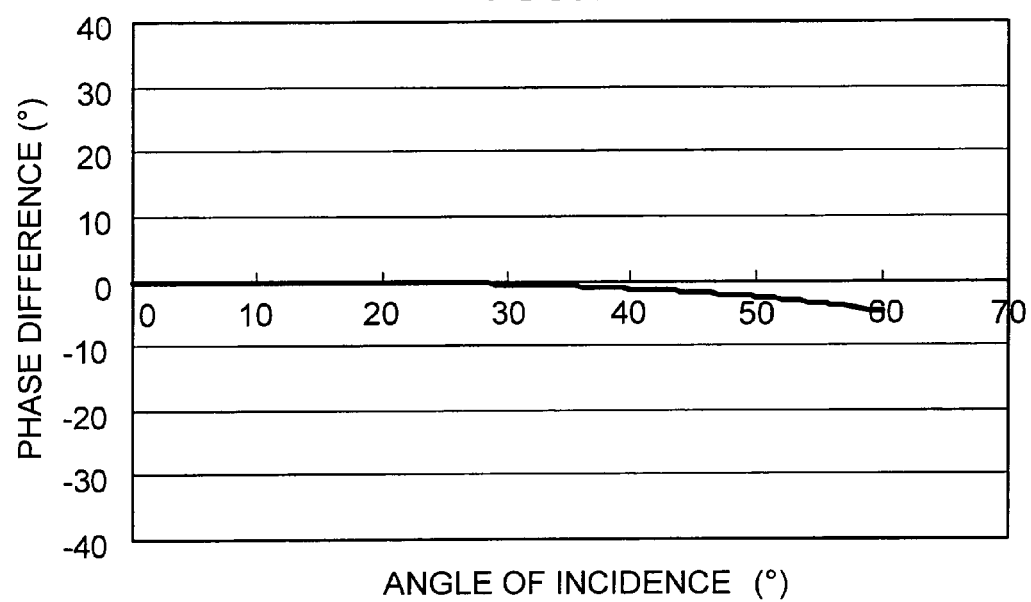

FIG. 24 is a phase difference characteristic graph showing the phase difference characteristic of the dielectric multilayer film according to the Example 5 (where, the wavelength is 785 nm).

Figure 25:
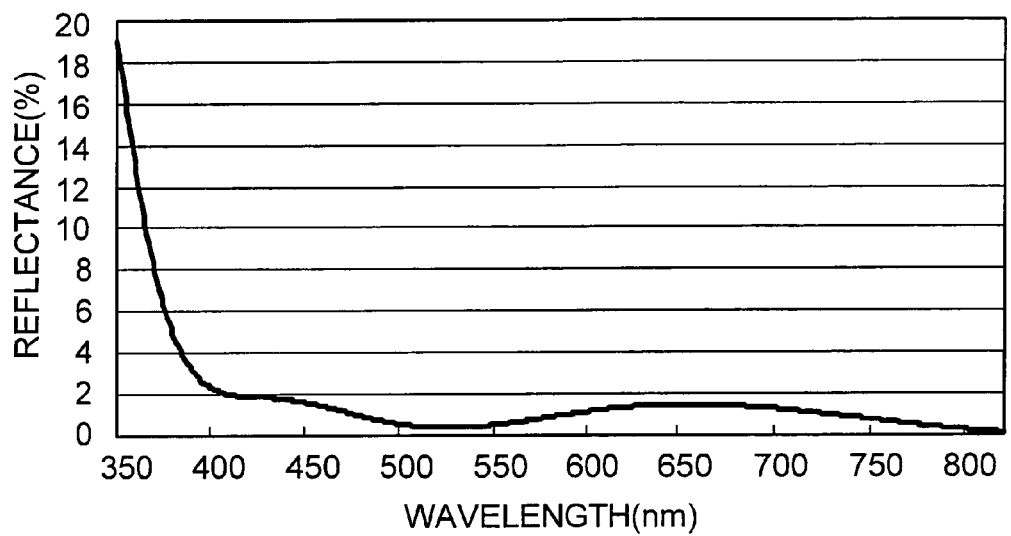

FIG. 25 is a reflection characteristic graph showing the reflection characteristic of a dielectric multilayer film according to an Example 6.

Figure 26:
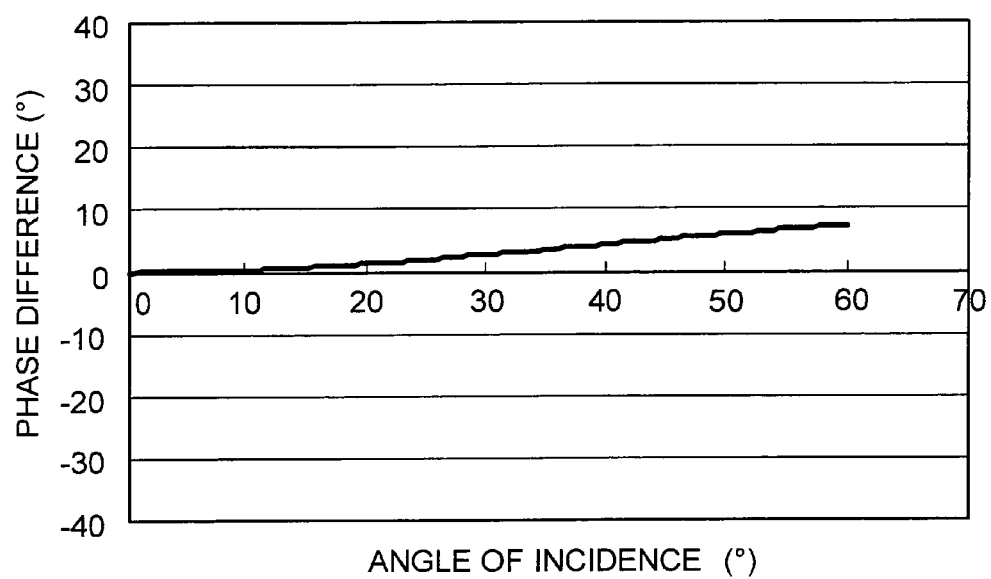

FIG. 26 is a phase difference characteristic graph showing the phase difference characteristic of the dielectric multilayer film according to the Example 6 (where, the wavelength is 405 nm).

Figure 27:
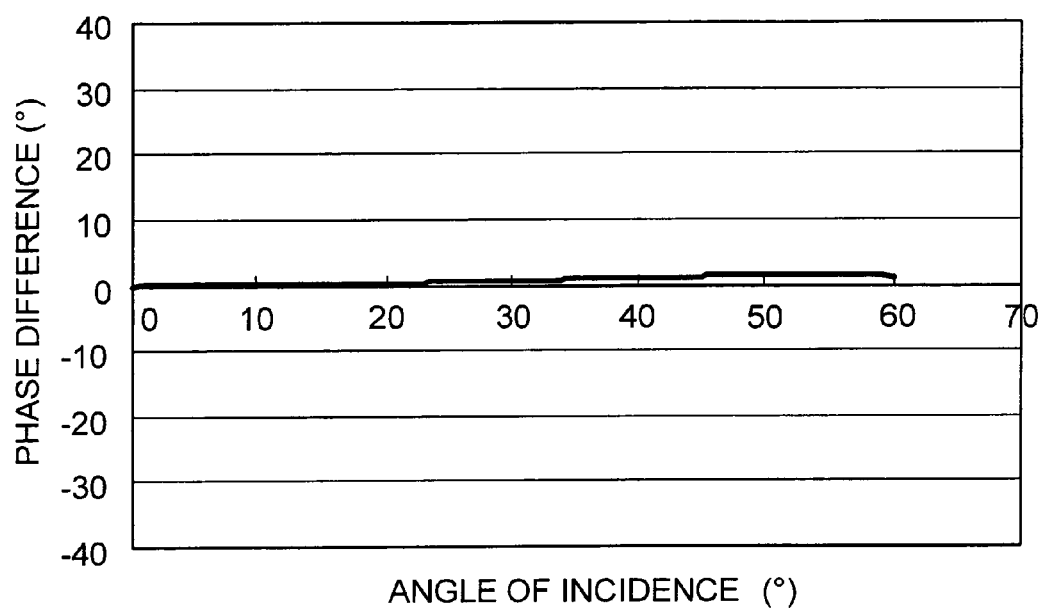

FIG. 27 is a phase difference characteristic graph showing the phase difference characteristic of the dielectric multilayer film according to the Example 6 (where, the wavelength is 660 nm).

4

Figure 28:
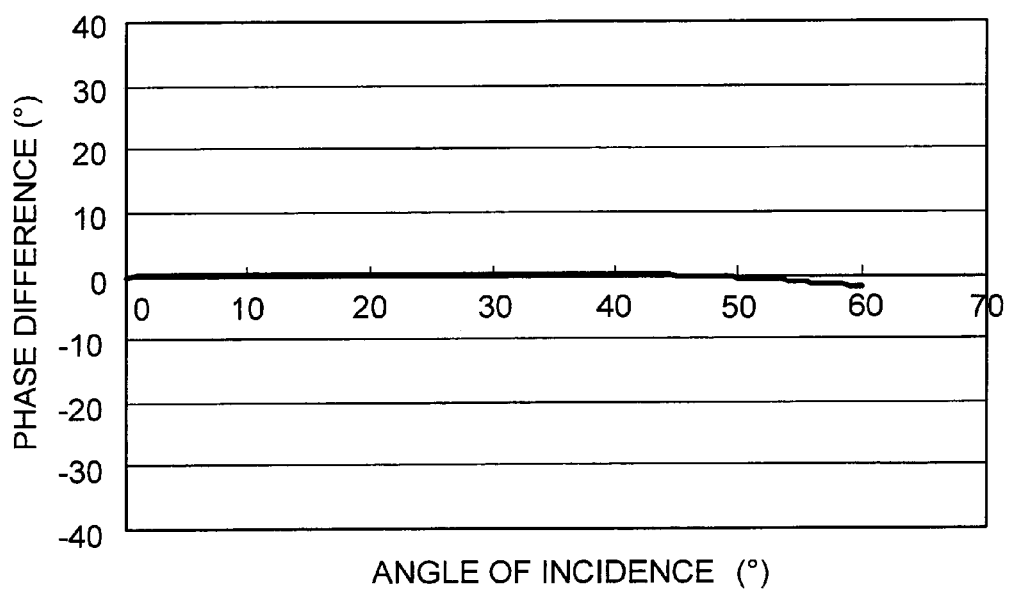

FIG. 28 is a phase difference characteristic graph showing the phase difference characteristic of the dielectric multilayer film according to the Example 6 (where, the wavelength is 785 nm).

Figure 29:
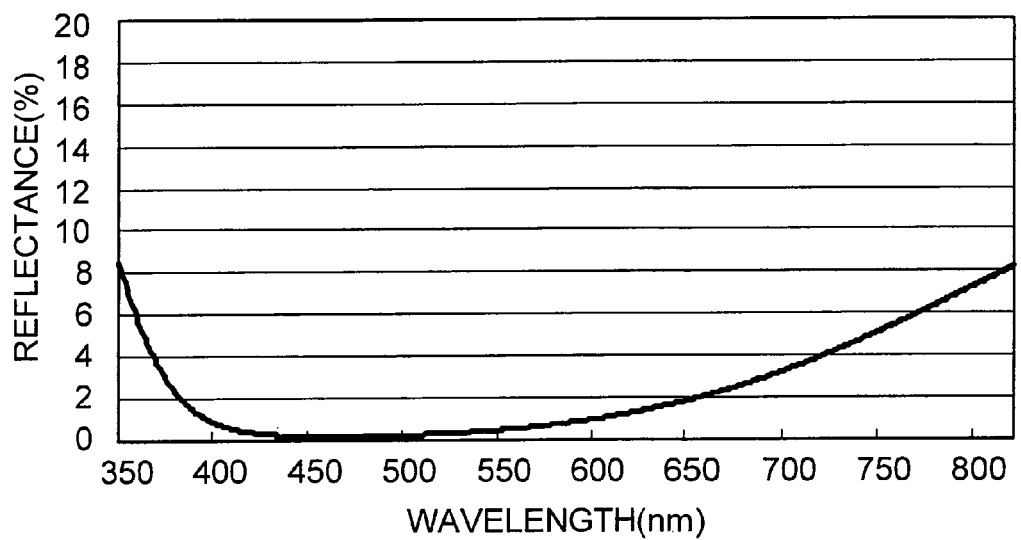

FIG. 29 is a reflection characteristic graph showing the reflection characteristic of a dielectric multilayer film according to a comparison example.

Figure 30:
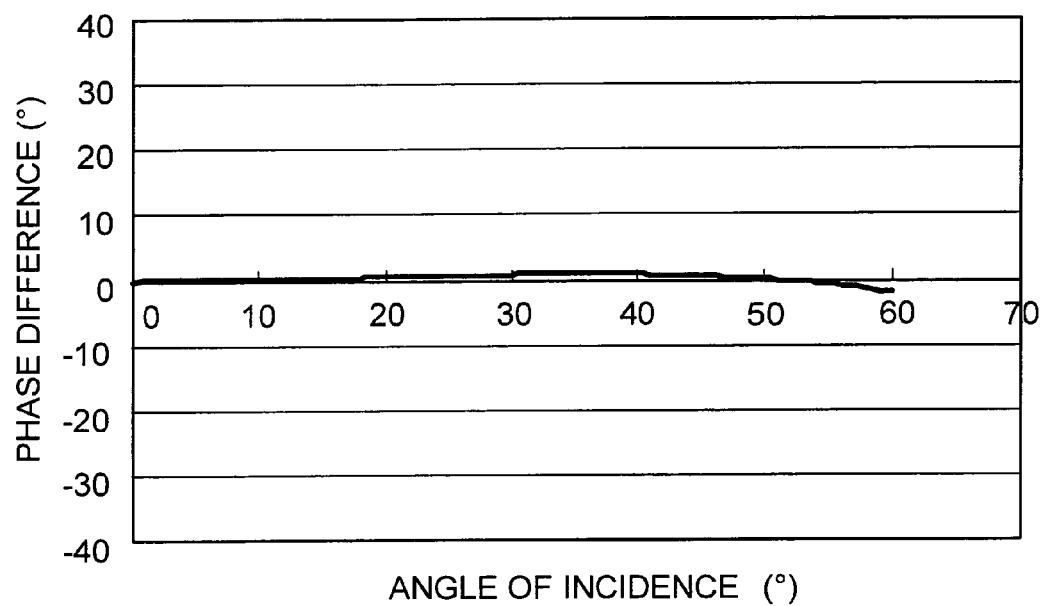

FIG. 30 is a phase difference characteristic graph showing the phase difference characteristic of the dielectric multilayer film according to the comparison example (where, the wavelength is 405 nm).

Figure 31:
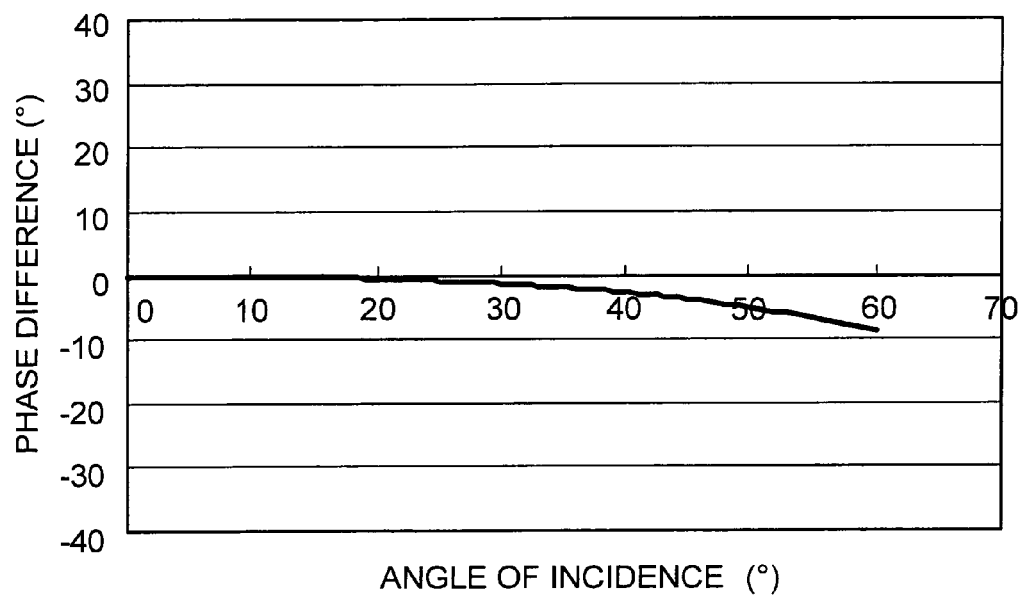

FIG. 31 is a phase difference characteristic graph showing the phase difference characteristic of the dielectric multilayer film according to the comparison example (where, the wavelength is 660 nm).

Figure 32:
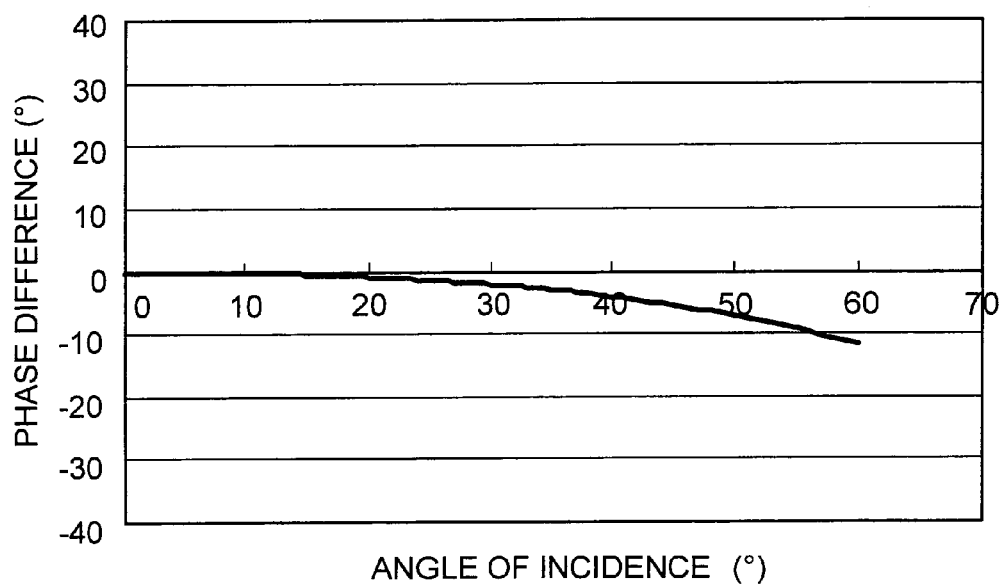

FIG. 32 is a phase difference characteristic graph showing the phase difference characteristic of the dielectric multilayer film according to the comparison example (where, the wavelength is 785 nm).

Figure 33:
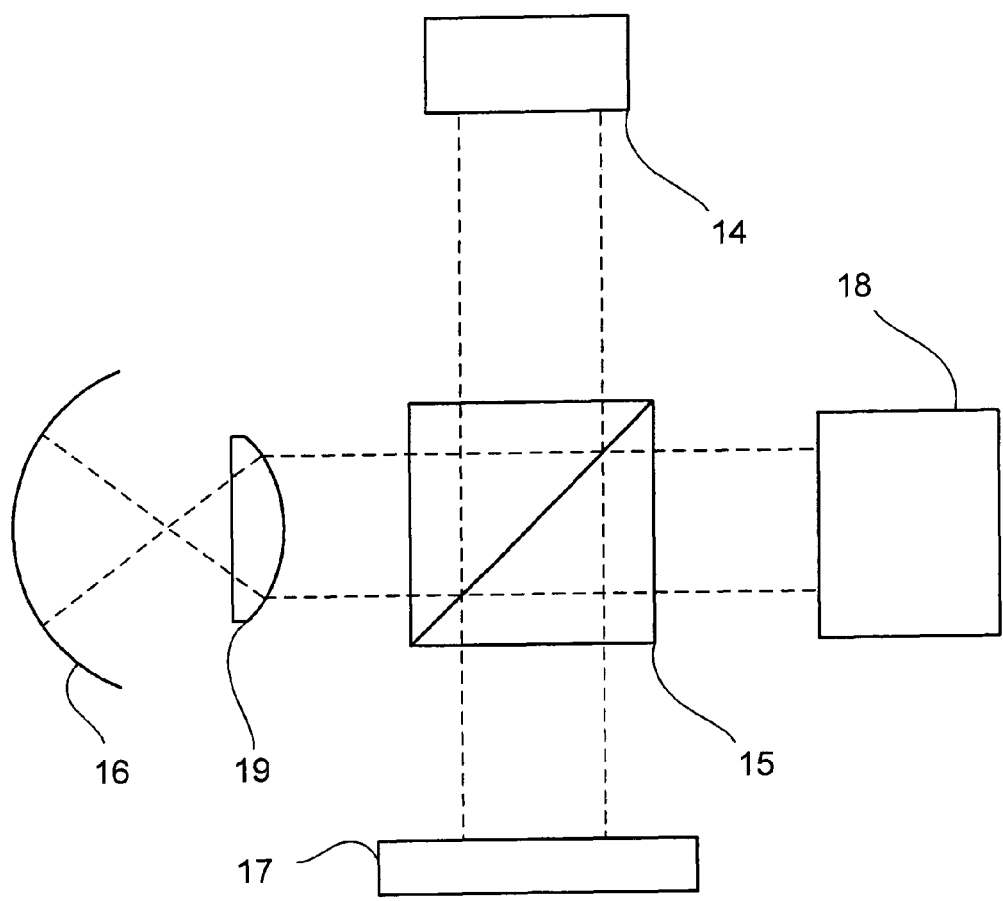

FIG. 33 is a schematic diagram of a Twyman-Green interferometer.

DETAILED DESCRIPTION OF THE PREFERRED EMBODIMENTS

First Embodiment

1. About Optical Pickup Device

Figure 2:
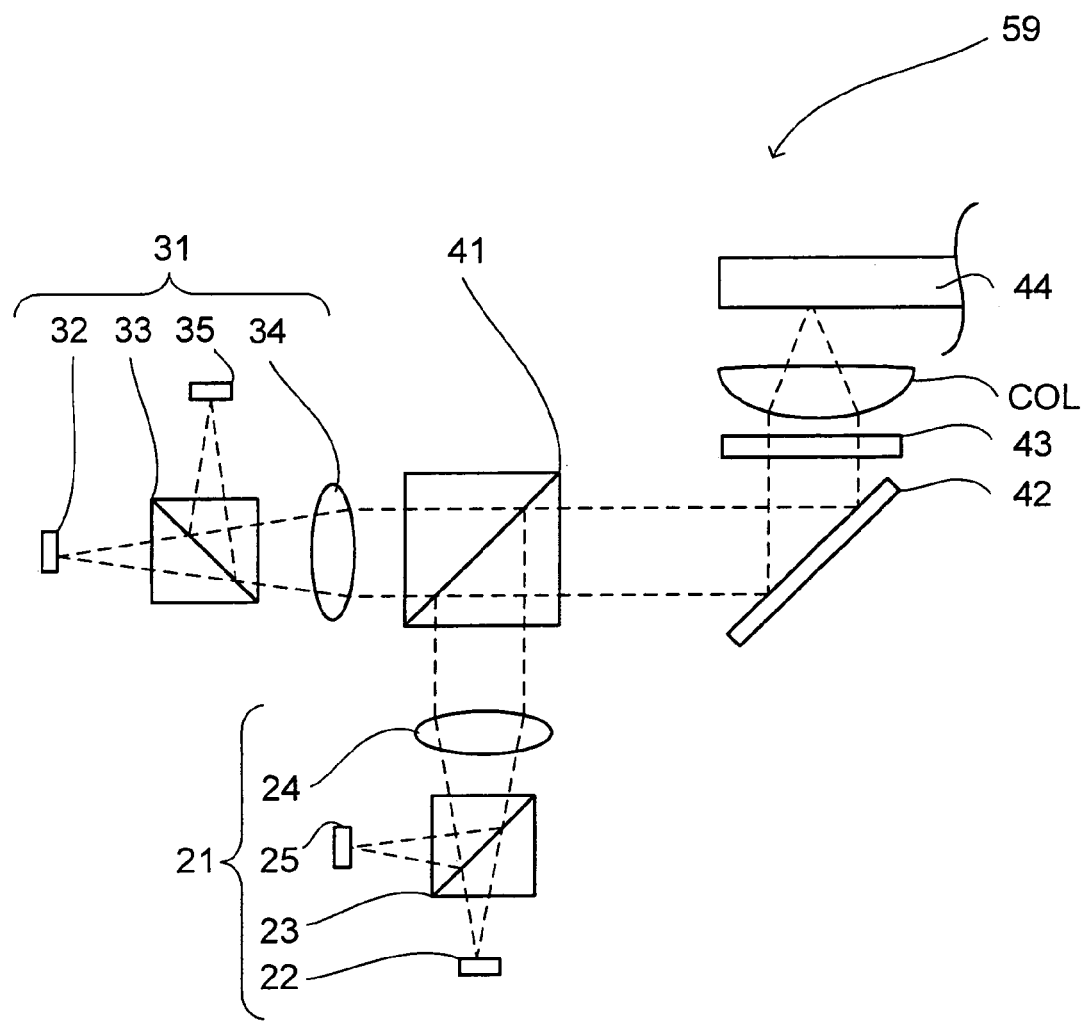
FIG. 2 is a schematic diagram of an optical pickup device.

FIG. 2 is a schematic diagram showing a general structure of an optical pickup device 59. This optical pickup device 59 includes a first laser unit 21, a second laser unit 31, a dichroic prism 41, an upstand mirror 42, a quarter wavelength plate 43 and a coated objective lens COL. Note that an optical disc 44 is also shown in FIG. 2 for convenience sake. Furthermore, light entering the optical disc 44 is referred to as "irradiating light", and light reflected by the optical disc 44 is referred to as "signal light" (note that light is shown by a broken line in the drawings).

First, the first laser unit 21 will be described. The first laser unit 21 includes a first laser diode (LD) 22, a first polarizing beam splitter (PBS) 23, a first collimator lens 24 and a first photodiode (PD) 25.

The first LD 22 emits a laser beam (blue laser) having a wavelength of 405 nm to the first PBS 23. In other words, the first LD 22 corresponds to a Blu-ray Disc (BD) that is one of next-generation DVDs (Digital Versatile Discs).

The first PBS 23 lets the laser beam emitted from the first LD 22 with linear polarization (e.g., P-polarization) pass through so as to lead it to the first collimator lens 24. The first PBS 23 also reflects the signal light coming through the first collimator lens 24 (e.g., S-polarization) so as to lead it to the first PD 25.

The first collimator lens 24 converts the laser beam entering via the first PBS 23 into parallel rays and leads them to the dichroic prism 41. The first collimator lens 24 also leads the signal light coming via the dichroic prism 41 to the first PBS 23.

The first PD 25 receives the signal light that enters via the first PBS 23. This light reception by the first PD 25 enables detection of servo signals (a focus error signal and a tracking error signal), an information signal, an aberration signal and the like when data is reproduced or recorded on a Blu-ray Disc.

Next, the second laser unit 31 will be described. The second laser unit 31 includes a second LD 32, a second PBS 33, a second collimator lens 34 and a second PD 35.

The second LD 32 emits a laser beam with a wavelength of 660 nm and a laser beam with a wavelength of 785 nm toward the second PBS 33. In other words, the second LD 32 is a light source that emits two laser beams having different wavelengths that support a DVD and a CD (Compact Disc).

The second PBS 33 permits the laser beam emitted from the second LD 32 with linear polarization (e.g., P-polarization) to pass through and leads it to the second collimator lens 34. The second PBS 33 also reflects the signal light coming through the second collimator lens 34 (e.g., with S-polarization) and leads it to the second PD 35.

The second collimator lens 34 converts the laser beam coming via the second PBS 33 into parallel rays and leads it to the dichroic prism 41. The second collimator lens 34 also leads the signal light coming via the dichroic prism 41 to the second PBS 33.

The second PD 35 receives the signal light coming via the second PBS 33. The light reception by the first PD 25 enables detection of servo signals (a focus error signal and a tracking error signal), an information signal, an aberration signal and the like when data is reproduced or recorded on a DVD or a CD.

Next, the dichroic prism 41 will be described. The dichroic prism 41 reflects a laser beam coming from the first laser unit 21 so as to lead it to the upstand mirror 42 and permits the laser beam coming from the second laser unit 31 to pass through so as to lead it to the upstand mirror 42. In other words, the dichroic prism 41 is an optical path conversion element that converts laser beams coming from different directions into laser beams going out in the same direction.

The dichroic prism 41 also leads the signal light coming via the upstand mirror 42 to the first laser unit 21 or the second laser unit 31. More specifically, the signal light of the laser beam emitted from the first LD 22 is reflected by the dichroic prism 41 and is lead to the first collimator lens 24 of the first laser unit 21. In contrast, the signal light of the laser beam emitted from second LD 32 pass through the dichroic prism 41 and is lead to the second collimator lens 34 of the second laser unit 31.

Next, the upstand mirror 42 will be described. The upstand mirror 42 bends the optical path of the laser beam going out from the dichroic prism 41 towards the optical disc 44 and leads it to the coated objective lens COL. Therefore, the upstand mirror 42 is disposed in the optical path between the first LD 22 (or the second LD 32) and the optical disc 44, more specifically, between the dichroic prism 41 and the coated objective lens COL.

The upstand mirror 42 also bends the optical path of the signal light coming via the coated objective lens COL and leads it to the dichroic prism 41.

Next, the quarter wavelength plate 43 will be described. The quarter wavelength plate 43 converts the light with linear polarization (e.g., P-polarization) reflected by the upstand mirror 42 into light with circular polarization. The quarter wavelength plate 43 also converts the signal light (with circular polarization) from the optical disc 44 into light with linear polarization (e.g., S-polarization).

Next, the coated objective lens COL (optical element) will be described. The coated objective lens COL condenses the light reflected by the upstand mirror 42 and coming through the quarter wavelength plate 43 (irradiating light) onto the optical disc 44. The coated objective lens COL also leads the light reflected by the optical disc 44 (signal light) to the quarter wavelength plate 43. The coated objective lens COL is provided with a dielectric multilayer film MLR that is an antireflection film (AR film) (detail thereof will be described later).

In addition, the material of the objective lens OL of the coated objective lens COL is not limited to a specific material. However, it is desirable to use glass having high resistance against weather. For instance, the following glass mold lens is an example.

numerical aperture (NA): 0.85
lens outside diameter: 5 mm
thickness of the center: 2.6 mm Note that specifications of the numerical aperture of the coated objective lens COL to be used for a BD, a DVD and a CD are 0.85, 0.65 and 0.5, respectively.

Radial birefringence with the center of lens axis is generated in the objective lens OL that is formed by glass molding process, and quantity of the birefringence increases as being close to the outer edge of the objective lens OL. Since the birefringence of the objective lens OL is distributing radially from the lens axis, i.e., in an axially symmetric manner, an optic axis of birefringence (a fast axis or a slow axis) can be said to exist in the radial direction and the circumferential direction of the lens. As a result, light entering the outer edge of the objective lens OL (marginal ray) is affected largely by the birefringence so that wave aberration occurs.

Figure 1:
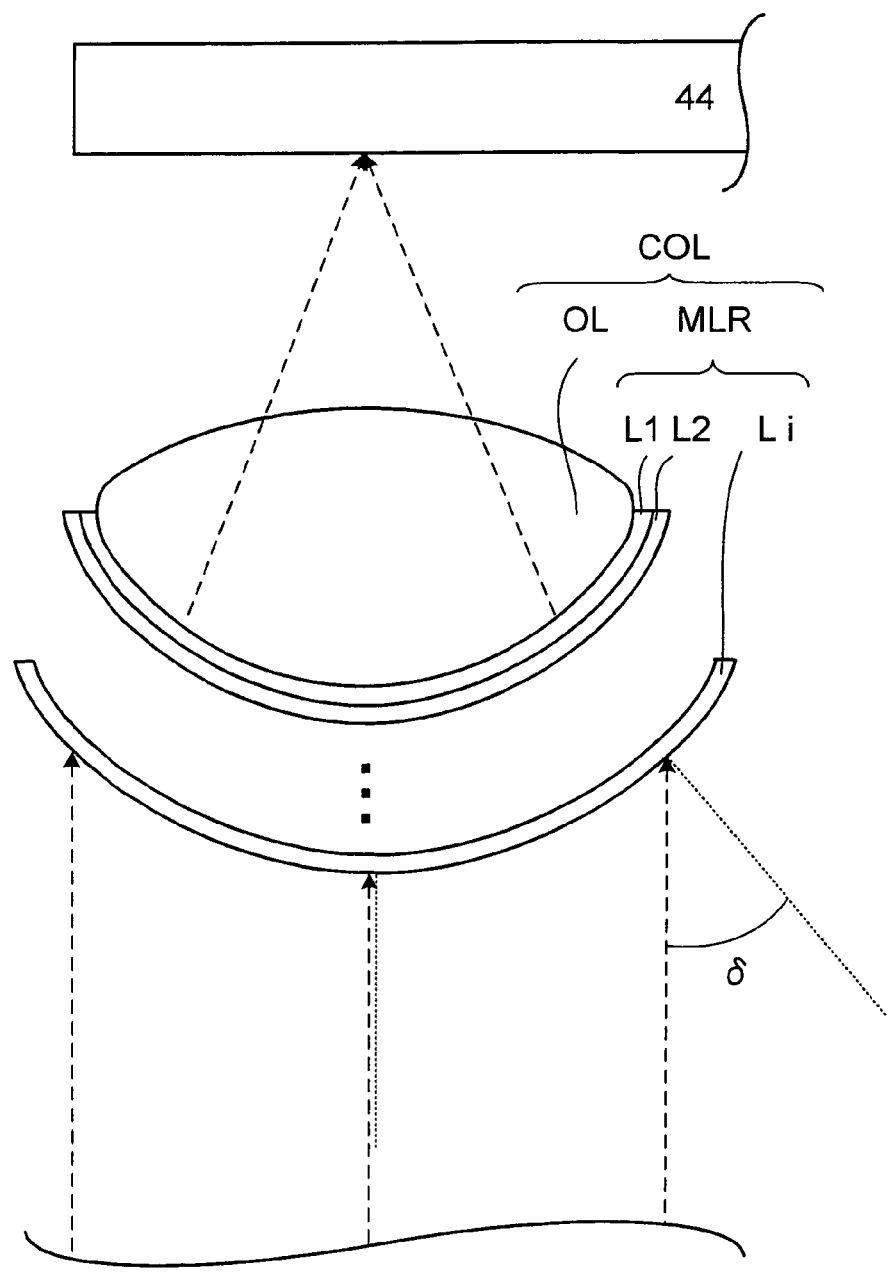
FIG. 1 is an enlarged view of an objective lens shown in FIG. 2.

As shown in FIG. 1 (that is an enlarged view of the coated objective lens COL shown in FIG. 2), the coated objective lens COL includes plurality of dielectric films Li for an anti-reflection process (AR process). As shown in FIG. 1, if parallel rays enter the dielectric film Li for example, the angle of incidence δ increases gradually as being close to the outer edge of the coated objective lens COL (the dotted line in FIG. 1 indicates the normal to the dielectric film Li at the incident point).

In general, when the angle of incidence δ changes, a phase difference of the propagating light between the P-polarization (that vibrates in parallel with the plane of incidence) and the S-polarization (that vibrates perpendicularly to the plane of incidence) is changed by the dielectric film Li.

It is desirable that the phase difference between the P-polarization and the S-polarization (more specifically, the phase difference of transmitted light that passes through the plurality of dielectric films Li (the dielectric multilayer film MLR); transmission phase difference D) and the phase difference between the P-polarization and the S-polarization due to the birefringence (birefringence phase difference) have opposite polarities. This structure enables the birefringence phase difference to be cancelled by the transmission phase difference D due to the dielectric film Li. If the birefringence phase difference is cancelled in this manner, an astigmatism component in the wave aberration is reduced. As a result, the astigmatism component in the wave aberration generated by the lens can be reduced easily to a half or less, more preferably ⅓ or less.

In addition, it is preferable that the transmission phase difference D due to the dielectric film Li increases substantially and monotonously from the lens center to the outer edge portion. Since the birefringence of the objective lens OL increases as being close to the outer edge portion, it can be cancelled by the transmission phase difference D. Note that to increase substantially and monotonously means that the transmission phase difference D increases as a whole as being close to the outer edge portion. Even if the transmission phase difference D decreases a little at the vicinity of the most outer edge portion, it can be said to increase substantially and monotonously.

As described above, the transmission phase difference D of the dielectric film Li compensates the birefringence of the objective lens OL, so that operational stability of the optical pickup can be improved. In addition, if the objective lens OL has birefringence, it changes a polarized state of the outgoing light. More specifically, the signal light includes components except the component with S-polarization when it goes towards the first PBS 23 and the second PBS 33. As a result, so-called return light occurs that passes through the PBSs 23 and 33 to reach the LD. The return light must be eliminated as much as possible because it causes unstable oscillation. Since the transmission phase difference D of the dielectric film Li cancels the birefringence of the objective lens OL, the influence of the return light can be extremely little.

2. About Detail of Antireflective Film

Hereinafter, the dielectric multilayer film (optical multilayer film) MLR of the antireflective film will be described in detail. As shown in FIG. 1, the coated objective lens COL is coated with a plurality of dielectric films Li. More specifically, the plurality of dielectric films Li ($i=1, 2, 3, \ldots$) are formed on one surface of the coated objective lens COL to which light coming from the quarter wavelength plate 43 enters. Note that $i=1$ means the dielectric film that is closest to the coated objective lens COL.

The reflectance of the dielectric multilayer film MLR can be determined by using the Fresnel's formula below with "film thickness of each dielectric film Li" and "refractive index of each dielectric film Li" at each interface ("the number of films (the number of layers) of the dielectric films Li").

$$R=((n_2-n_1)/(n_2+n_1))^2 \qquad \text{Fresnel's formula}$$

Note that the reflectance R is a value in the case where light enters vertically from a first medium with a refractive index $n_1$ to a second medium with a refractive index $n_2$.

However, the dielectric multilayer films MLR in Example 1 to Example 6 that will be described later are designed not only for antireflection but also for generating the transmission phase difference D (phase difference between the P-polarization and the S-polarization). The principle of adjustment of the transmission phase difference D is as follows.

Usually, when light passes through media having different refractive indexes (refractive index $n_H$>refractive index $n_L$), a phase $\theta_H$ of light that passes through the medium with the refractive index $n_H$ (P-polarization phase $\theta_{HP}$·S-polarization phase $\theta_{HS}$) lags from a phase $\theta_L$ of light that passes through the medium with the refractive index $n_L$ (P-polarization phase $\theta_{LP}$·S-polarization phase $\theta_{LS}$). Therefore, the lagging causes a difference between the phase difference (phase $\theta_{HP}$–phase $\theta_{HS}$) between the P-polarization and the S-polarization generated when the light passes through the medium with the refractive index $n_H$ and the phase difference (phase $\theta_{LP}$–phase $\theta_{LS}$) between the P-polarization and the S-polarization generated when the light passes through the medium with the refractive index $n_L$. Then, the transmission phase difference D can be set appropriately by using a difference of refractive index (refractive index difference) between media and a distance (film thickness) in the medium as a parameter.

Therefore, six types (Example 1 to Example 6) of construction data of the dielectric multilayer films MLR considering the transmission phase difference D are shown in Table 1 to Table 6. In addition, one type of construction data of the dielectric multilayer film MLR without considering the transmission phase difference D is shown in Table 7 as a comparison example. However, the construction data of Table 1 to Table 6 are values derived by using film structure design software that is commercially available with antireflection characteristic and a desired phase difference as a target value. In addition, the construction data of the comparison example are values of the antireflective film that is used generally and conventionally. Note that the refractive index (nd) corresponds to the d-line (with a wavelength of 587.6 nm), and that Abbe number vd of glass corresponding to the d-line is 56.88.

In addition, the material of the dielectric film Li is shown by a chemical formula if it is a single compound, while it is shown by a product name if it is a mixture (as follows).

magnesium fluoride: $MgF_2$
aluminum oxide (alumina): $Al_2O_3$
titanium oxide: $TiO_2$
"substance H4" produced by Merck Ltd., Japan: $H_4$
Note that H4 is a mixture of $TiO_2$ and $La_2O_3$ (lanthanum oxide)
"substance M3" produced by Merck Ltd., Japan: M3
Note that M3 is a mixture of $Al_2O_3$ and $La_2O_3$ In accordance with the refractive index of the material, the dielectric film (layer) Li is defined as follows.

low refractive index layer L: dielectric film Li with a refractive index smaller than 1.6
medium refractive index layer M: dielectric film Li with a refractive index larger than or equal to 1.6 but smaller than or equal to 1.9
high refractive index layer H: dielectric film Li with a refractive index larger than 1.9

In addition, FIGS. 5-32 shows reflection characteristic graphs (showing relationships between the wavelength [nm] and the reflectance [%]) and phase difference characteristic graphs (showing relationships between the angle of incidence (degrees) to the dielectric multilayer film MLR and the phase difference (degrees), where, the phase difference is the transmission phase difference D) corresponding to the Example 1 to the Example 6 and the comparison example. Furthermore, relationships between the graphs and the examples (including the comparison example) are shown in Table 8.

Note that the vertical axis of the phase difference characteristic graph indicates a difference determined by subtracting the phase of S-polarization from the phase of P-polarization. Furthermore, "+" of the vertical axis in the phase difference characteristic graph indicates that the phase of S-polarization lags from the phase of P-polarization, while "−" of the vertical axis indicates that the phase of S-polarization leads the phase of P-polarization. In addition, it is supposed that the transmission phase difference D that cancels the birefringence phase difference is a value indicated with "+" in the graph.

[2-1. About Construction Data]

The following things can be understood from the construction data of the above-mentioned Example 1 to Example 6. The dielectric multilayer film MLR shown in the Example 1 to the Example 6 has three types of layers, which are a low refractive index layer L, a medium refractive index layer M and a high refractive index layer H. Note that the total numbers of layers included in the dielectric multilayer film MLR (the total number of dielectric films Li) are 12, 9, 9, 7, 7 and 5 for the Example 1, the Example 2, the Example 3, the Example 4, the Example 5 and the Example 6, respectively.

In addition, the dielectric multilayer film MLR shown in the Example 1 to the Example 6 includes a cyclic structure in which the low refractive index layers L and the high refractive index layers H are laminated alternately. Furthermore, if a double layer made of one low refractive index layer L and one high refractive index layer H that contact with each other intimately is considered to be a pair, the numbers of pairs in the Example 1, the Example 2, the Example 3, the Example 4, the Example 5 and the Example 6 are 5 pairs, 4 pairs, 3 pairs, 3 pairs, 2 pairs, 2 pairs, respectively.

In addition, the relationships of the refractive index differences ($N_H$–$N_L$) between the refractive index $N_H$ of the high refractive index layer H and the refractive index $N_L$ of the low refractive index layer L in the Example 1, the Example 2, the Example 3, the Example 4, the Example 5 and the Example 6 are 0.73, 1.04, 0.73, 0.73, 0.73 and 0.73, respectively.

Note that the following description is true from the construction data of the comparison example. The dielectric multilayer film MLR of the comparison example has the three types of layers including the low refractive index layer L, the medium refractive index layer M and the high refractive index layer H similarly to the Example 1 to the Example 6. However the number of layers included in the dielectric multilayer film MLR is three.

In addition, the dielectric multilayer film MLR of the comparison example includes a cyclic structure in which the low refractive index layers L and the high refractive index layers H are laminated alternately similarly to the Example 1 to the Example 6. However, the number of pairs is one pair.

Furthermore, in the comparison example, the refractive index difference between the refractive index $N_H$ of the high refractive index layer H and the refractive index $N_L$ of the low refractive index layer L is 1.04.

[2-2. About Reflection Characteristic Graph and Phase Difference Characteristic Graph]

In addition, the following description is true from the reflection characteristic graph and the phase difference characteristic graph of the Example 1 to the Example 6. In the Example 1 to the Example 6, reflectance values corresponding to the wavelengths (405, 660 and 785 nm) of a BD, a DVD, and a CD become smaller than 3%. Therefore, when the dielectric multilayer films MLR shown in the Example 1 to the Example 6 are formed on the objective lens OL, reflection light from the coated objective lens COL can be suppressed effectively.

If the angle of incidence δ (degrees) is specified in the Example 1 to the Example 6, the transmission phase difference D (degrees) is within a specific range. For example, if the used wavelength is 405 nm, transmission phase difference D (degrees) is as follows.

If δ=30 degrees, D is larger than or equal to 2 degrees, but it is smaller than or equal to 20 degrees (2≦D≦20)

If δ=60 degrees, D is larger than or equal to 4 degrees, but it is smaller than or equal to 40 degrees (4≦D≦40)

Further, if the used wavelength is 405 nm, the transmission phase difference D increases monotonously as the angle of incidence δ increases within the range that satisfies "30 degrees≦δ≦60 degrees". This is clearly understood from the graph line in the phase difference characteristic graph. Note that monotonous change means monotonous increase or monotonous decrease, and linear change is one example of the monotonous change.

In addition, the angle of incidence δ on the horizontal axis of the phase difference characteristic graph is related to the radial direction of the coated objective lens COL. It is clearly understood from FIG. 1 showing the case where the dielectric multilayer film MLR is provided to the objective lens OL.

Then, it is desirable that the dielectric multilayer film MLR shown in the Example 1 to the Example 6 is formed on the objective lens OL if the objective lens OL has the radial birefringence with the center of lens axis and if quantity of the birefringence increases as being close to the outer edge of the objective lens OL. It is because that the transmission phase difference D occurs radially with the center of the lens axis corresponding to the birefringence of the objective lens OL in the dielectric multilayer film MLR formed on the objective lens OL (i.e., in the coated objective lens COL) and that quality of the phase difference increases as being close to the outer edge of the objective lens OL.

In other words, the transmission phase difference D due to the dielectric multilayer film MLR corresponds to the birefringence phase difference due to the objective lens OL. Therefore, if light with wavelength of 405 nm enters the coated objective lens COL on which the dielectric multilayer film MLR shown in the Example 1 to the Example 6, the transmission phase difference D due to the dielectric multilayer film MLR can sufficiently cancel the birefringence phase difference due to the objective lens OL. As a result, components of astigmatism in the wave aberration can be reduced.

Note that the birefringence phase difference is inversely proportional to the used wavelength. Then, even if a value of the transmission phase difference D in the case of the used wavelength 660 or 785 nm is smaller than a value of the transmission phase difference D in the case of the used wavelength 405 nm in the phase difference characteristic graph shown in the Example 1 to the Example 6, there will be no problem. It is because that the birefringence phase difference that occurs as a relatively small value in an inversely proportional manner to the used wavelength can be sufficiently canceled by relatively small transmission phase difference D in the case of the used wavelength 660 or 785 nm. Therefore, if the transmission phase difference D and the birefringence phase difference are canceled by each other in the case of the used wavelength 405 nm, the transmission phase difference D and the birefringence phase difference can be canceled by each other also in the case of the used wavelength 660 or 785 nm.

In addition, the numerical aperture of the lens corresponding to the used wavelength 660 nm for a DVD and 785 nm for a CD are 0.65 and 0.5, respectively. In other words, the diameter of the light beam entering the coated objective lens COL is smaller than the case where light with the wavelength 405 nm enters. Since the light with the wavelength 660 nm or 785 nm does not enter the outer edge portion of the lens, influence of the birefringence is small so that there is no problem even if a large phase difference is not generated.

Note that the following fact is derived from the reflection characteristic graph and the phase difference characteristic graph of the comparison example. In the comparison example, the reflectance corresponding to the wavelength (405, 660 or 785 nm) corresponding to a BD, a DVD or a CD is smaller than 5.5%. Therefore, comparing the case where the dielectric multilayer film MLR of the comparison example is formed on the objective lens OL with the case where the dielectric multilayer film MLR shown in the Example 1 to the Example 6 is formed on the objective lens OL, it is understood that the coated objective lens COL corresponding to the Example 1 to the Example 6 can suppress the reflection light more effectively than the coated objective lens COL corresponding to the comparison example.

In addition, the transmission phase difference D is not considered in the dielectric multilayer film MLR of the comparison example. Therefore, in every used wavelength, "+" transmission phase difference D hardly occur, and rather "−" transmission phase difference D is apt to occur.

3. About Measurement

Here, the fact that the wave aberration that occurs in the outgoing light from the coated objective lens COL, in particular the component of astigmatism is reduced by the dielectric multilayer film MLR will be shown with measured data. First, a method for measuring the wave aberration will be described.

The wave aberration is measured with a Twyman-Green interferometer as shown in FIG. 33. The Twyman-Green interferometer includes a laser light source 14 that emits light with linear polarization, a beam splitter 15, a spherical standard 16, a plane standard 17 and an image processing device 18 that receives an interference pattern image so as to perform computation of wave aberration. A light beam from the light source is divided by the beam splitter 15. One of the light beams is reflected by the plane standard 17, and the other light beam is condensed by a subject lens 19 and is reflected by the spherical standard 16. Reference light reflected by the plane standard 17 and measurement light after passing through the subject lens 19 again are combined by the beam splitter 15 so as to generate an interference pattern. The interference pattern is received by the image processing device 18, which processes it so that wave aberration of the subject lens 19 is measured. Note that the degree of parallelization (degree of divergence) of the light beam entering the subject lens 19 is adjusted in accordance with the actual state of using the subject lens 19 if necessary.

The measurement of the astigmatism component of wave aberration is performed in the following steps. In the first step, the subject lens 19 is placed so that the focal point of the subject lens 19 (coated objective lens COL or the like) agrees the center of curvature of the spherical standard 16. Then, wave aberration is measured from the interference pattern generated by the reflection light from the spherical standard 16 and the reflection light from the plane standard 17 (the first measurement that is performed at 0 degree of the lens position). Next, the subject lens 19 is revolved from the first measurement position around the optical axis by 90 degrees, and then wave aberration is measured in the same manner as the first measurement (the second measurement that is performed at 90 degrees of the lens position).

Then, astigmatism component of wave aberration is determined from the wave aberrations (wave aberration values at 0 degree and 90 degrees of the lens position) obtained as described above. More specifically, each wave aberration is expanded first by Zernike polynomial, so that coefficients of Z4 term and Z5 term in the polynomial are obtained. After that, astigmatism component (mλ rms) of the wave aberration is determined from the following equation.

$$AS=\sqrt{(((Z4(0\ degree)+Z4(90\ degrees))/2\sqrt{6})^2+((Z5(0\ degree)+Z5(90\ degrees))/2\sqrt{6})^2)}$$

where,

AS is an astigmatism component of wave aberration,

Z4 (0 degree) is the Z4 term in the Zernike polynomial at the lens position 0 degrees, Z4 (90 degrees) is the Z4 term in the Zernike polynomial at the lens position 90 degrees, Z5 (0 degree) is the Z5 term in the Zernike polynomial at the lens position 0 degrees, and Z5 (90 degrees) is the Z5 term in the Zernike polynomial at the lens position 90 degrees.

Note that the Zernike polynomial adopts an expansion of a so-called Arizona style, and more specifically, Metropro Zernike Application that is analyzer software made by Canon Sales Co., Inc. was used for calculation. In addition, the measurement of wave aberration is performed by using light with linear polarization. Although light with circular polarization is usually used for measuring wave aberration with an interferometer, the astigmatism component of wave aberration due to the birefringence described above cannot be detected by the method using light with circular polarization.

Since two types of objective lens OL (first objective lens OL1 and second objective lens OL2) without the antireflective film is used in the measurement based on the method described above, the cases of types of the objective lens OL will be described as follows. Note that both the first objective lens OL1 and the second objective lens OL2 are made by glass molding, and both of them have a numerical aperture of 0.85.

[3-1. Measurement of Wave Aberration of First Objective Lens]

First, the astigmatism component of wave aberration due to the first objective lens OL1 is determined by the above-mentioned measurement method, and a result of 20.1 mλ rms is obtained.

Next, astigmatism component of wave aberration the first objective lens OL1 on which the dielectric multilayer film MLR of the comparison example is formed is determined, and a result of 18.8 mλ rms is obtained (it is reduced by approximately 1 mλ rms). Note that a value of the transmission phase difference D at a certain angle of incidence δ in the dielectric multilayer film MLR of the comparison example is as follows:

D≦3 degrees if δ=30 degrees, and
D≦3 degrees if δ=60 degrees.

Further, astigmatism component of wave aberration of the first coated objective lens COL with the dielectric multilayer film MLR of the Example 1 that is formed on the first objective lens OL1 is determined, and a result of 1.7 mλ rms is obtained (it is reduced by approximately 18 mλ rms). Note that in the dielectric multilayer film MLR of the Example 1, a value of the transmission phase difference D at a certain angle of incidence δ is as follows:

D=8 degrees if δ=30 degrees, and
D=18 degrees if δ=60 degrees.

It is understood from the measurement data described above that although the dielectric multilayer film MLR of the comparison example cannot reduce sufficiently the astigmatism component of wave aberration due to the first objective lens OL1, the dielectric multilayer film MLR in the Example 1 can reduce the astigmatism component of wave aberration due to the first objective lens OL1.

[3-2. Measurement of Wave Aberration of Second Objective Lens]

Next, wave aberration of the second objective lens OL2 that is different from the first objective lens OL1 is measured, and a result of astigmatism component 18.5 mλ rms is obtained.

Next, astigmatism component of wave aberration of the second coated objective lens COL with the dielectric multilayer film MLR of the Example 2 formed on the second objective lens OL2 is determined, and a result of 1.1 μmλ rms is obtained (it is reduced by approximately 17 mλ rms). Note that in the dielectric multilayer film MLR of the Example 2, a value of the transmission phase difference D at a certain angle of incidence δ is as follows:

D is 4 degrees if δ=30 degrees, and
D is 12 degrees if δ=60 degrees.

From the measured data described above, it is understood that the dielectric multilayer film MLR of the Example 2 can sufficiently reduce the astigmatism component of wave aberration due to the second objective lens OL2.

[3-3. Confirmation of Birefringence of Lens]

Note that the fact that the objective lenses OL1 and OL2 have radial birefringence with the center of the lens axis was confirmed by the following method.

Figure 3A:
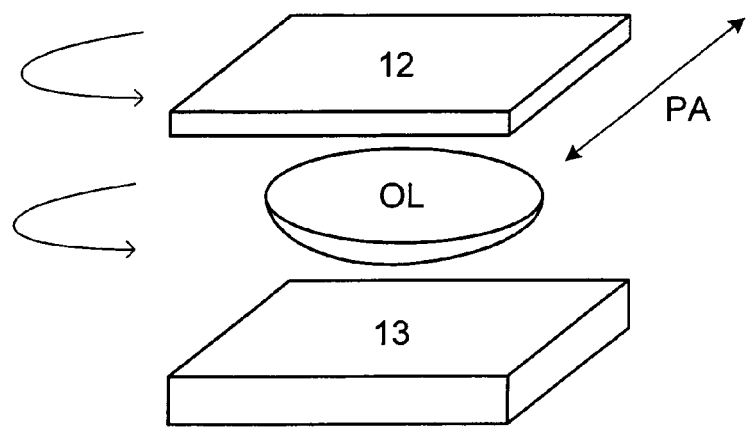
FIG. 3A is a perspective view of a confirmation device for confirming birefringence.

As shown in FIG. 3A, the objective lens OL is disposed between a polarizing plate 12 with a transmission axis PA and a plane mirror 13, so that the interference pattern is observed. Light that passed through the polarizing plate 12 (light vibrating in the same direction as the transmission axis PA) passes through the objective lens OL and is reflected by the plane mirror 13. It passes the objective lens OL again and propagates toward the polarizing plate 12. In other words, the objective lens OL is disposed between parallel Nicol in an equivalent manner.

Figure 3B:
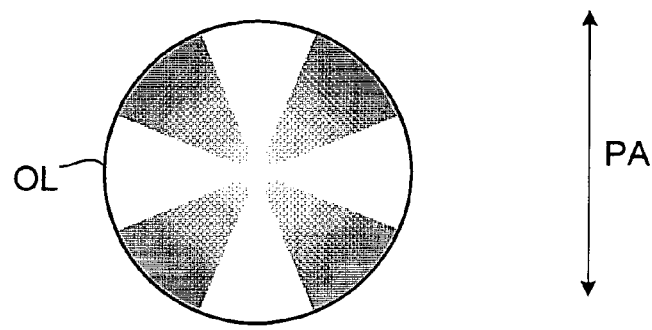
FIG. 3B is a plan view of a lens surface observed by the confirmation device.

FIG. 3B shows the objective lens OL that is observed through the polarizing plate 12. More specifically, an interference pattern is confirmed in which it is observed as white color in the same direction as the transmission axis PA (parallel direction) and in the direction perpendicular to it while it is observed as black color in directions of 45 degrees (or 135 degrees) with respect to the transmission axis PA.

In addition, density of the interference pattern becomes thick as being close to the outer edge from the lens axis of the objective lens OL.

Figure 3C:
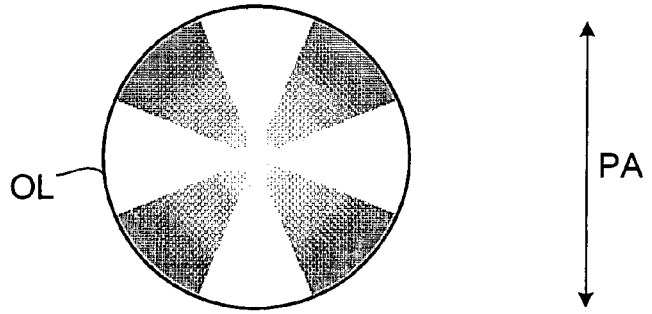
FIG. 3C is a plan view of a lens surface in the case where the objective lens is revolved.
Figure 3D:
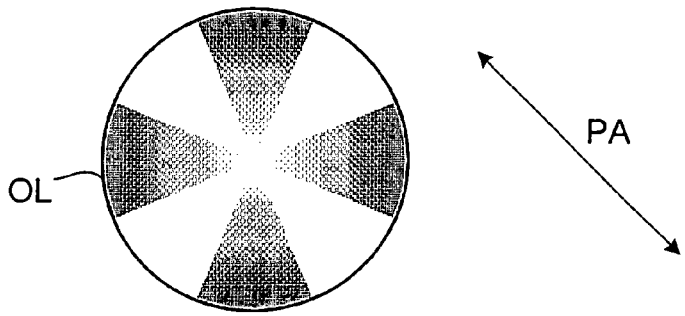
FIG. 3D is a plan view of a lens surface in the case where a polarizing plate in the confirmation device is revolved.
Figure 4:
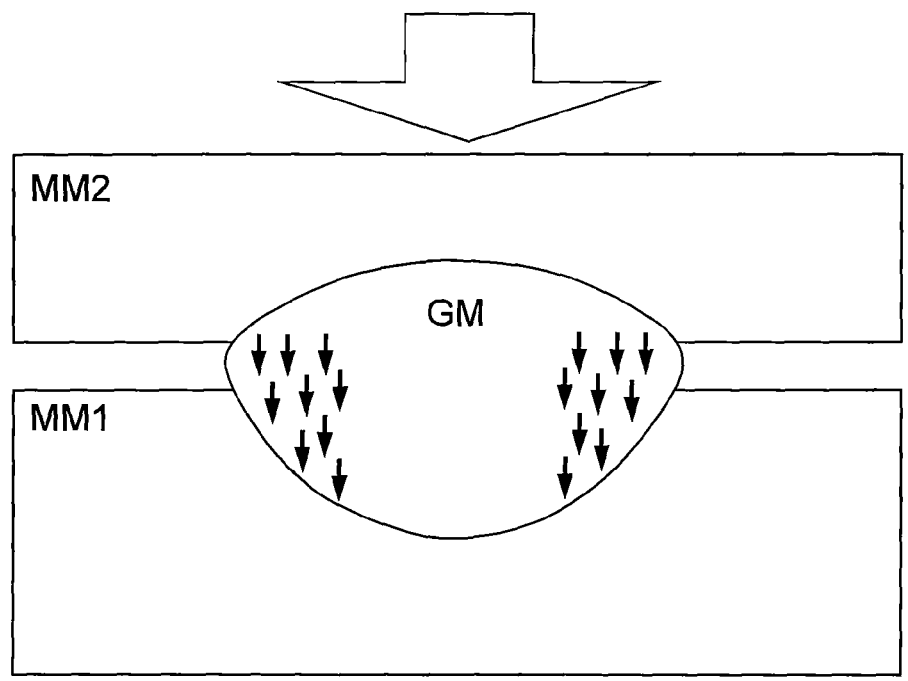
FIG. 4 is a schematic diagram showing a molding die of the objective lens and glass matrix.

FIG. 3C shows the lens surface in the state where the objective lens OL was revolved. Even the objective lens OL was revolved, the interference pattern was not revolved. FIG. 3D shows the lens surface in the state where the polarizing plate 12 was revolved. When the polarizing plate 12 was revolved, the interference pattern was revolved in the same manner as the polarizing plate 12.

From the result described above, it is understood that the objective lens OL has birefringence in a uniaxial crystal manner, and the optic axis thereof is the radial direction and the circumferential direction. In other words, the objective lens OL has radial birefringence. In addition, it is confirmed that a quantity of the birefringence increases as being close to the outer edge of the objective lens OL.

[3-4. Verification of Measurement]

The measurement of wave aberration of the coated objective lens COL was performed only for those with the dielectric multilayer films MLR of the Example 1 and the Example 2. However, it can be easily assumed that the dielectric multilayer films MLR of the other examples having the same phase difference as the Example 1 and the Example 2 can also reduce the astigmatism component of wave aberration due to the objective lens OL.

The astigmatism component of wave aberration of the first objective lens OL1 is a value larger than 20 m$\lambda$ rms, and the transmission phase difference D of the Example 1 is 18 degrees when the angle of incidence $\delta$ is 60 degrees. Since the transmission phase differences D of the Example 3 and the Example 4 are the same as that of the Example 1, they can cancel the birefringence that is similar to that of the first objective lens OL1. In addition, since the transmission phase difference D of the Example 5 is similar to that of the Example 2, it can cancel the birefringence that is similar to that of the second objective lens OL2. Since a level of the astigmatism component of wave aberration has correlation with a level of the birefringence, astigmatism component of wave aberration can be reduced effectively by applying the Example 6 to an objective lens having birefringence smaller than the second objective lens OL2. On the contrary, as for an objective lens having birefringence larger than the first objective lens OL1, it is preferable to use the dielectric multilayer film that can generate a larger phase difference.

If astigmatism component of wave aberration of the objective lens OL is 20 m$\lambda$ rms or larger, it is desirable to generate a relatively large phase difference. The dielectric multilayer film MLR that can generate a large phase difference and realize antireflection preferably includes the low refractive index layer L, the medium refractive index layer M and the high refractive index layer H having total nine or more layers (corresponding to the Example 1 to the Example 3). Alternatively, the dielectric multilayer film MLR preferably includes total seven or more layers of optical thin films and has a cyclic structure in which the low refractive index layers L and the high refractive index layers H are laminated alternately. It is preferable that a difference between the refractive index $N_H$ of the high refractive index layer H and the refractive index $N_L$ of the low refractive index layer L is 0.5 or larger (corresponding to the Example 1 to the Example 5). Although even the number of layers smaller than the above-mentioned condition can realize the antireflection function, it is difficult to generate the phase difference that can compensate the birefringence. In any case, it is further desirable that the number of layers of the dielectric multilayer film MLR is 20 or smaller. If it is larger than the upper limit, a ripple will occur due to a variation in the manufacturing process, and it is difficult to secure the antireflection characteristic stably.

If the astigmatism component of wave aberration of the objective lens OL is 10 m$\lambda$ rms or larger and smaller than 20 m$\lambda$ rms, it is desirable to generate a relatively small phase difference. The dielectric multilayer film MLR that generates a relatively small phase difference and realize the antireflection function has the low refractive index layer L, the medium refractive index layer M and the high refractive index layer H including total seven or more layers (corresponding to the Example 1 to the Example 5). Alternatively, the dielectric multilayer film MLR preferably includes total five or more layers of dielectric films and has a cyclic structure in which the low refractive index layers L and the high refractive index layers H are laminated alternately. It is preferable that a difference between the refractive index $N_H$ of the high refractive index layer H and the refractive index $N_L$ of the low refractive index layer L is 0.5 or larger (corresponding to Example 1 to the Example 6). Although even the number of layers smaller than the above-mentioned condition can realize the antireflection function, it is difficult to generate the phase difference that can compensate the birefringence. If it is larger than the upper limit, a ripple will occur due to a variation in the manufacturing process, and it is difficult to secure the antireflection characteristic stably.

4. Summary

As a summary, the coated objective lens COL can be said as follows. It is supposed that birefringence occurs in the objective lens OL and causes wave aberration in the outgoing light from the objective lens OL. Then, if the astigmatism component of wave aberration of 10 m$\lambda$ rms or larger occurs, the coated objective lens COL has a dielectric multilayer film MLR that reduces the astigmatism component to 5 m$\lambda$ rms or smaller.

Note that the principle of reducing astigmatism component of wave aberration is to cancel birefringence phase difference that is one of causes of the astigmatism component and the transmission phase difference D in the dielectric multilayer film MLR by each other. Therefore, it is desirable that the coated objective lens COL have the dielectric multilayer film MLR that can generate the transmission phase difference D effectively. In addition, the phase difference generated by the dielectric multilayer film MLR increase substantially and monotonously as being close to the outer edge portion from the lens center.

An example of the coated objective lens COL is as follows. For example, an angle of incidence of light with a wavelength of 405 nm entering the dielectric multilayer film MLR is denoted by $\delta$, a phase difference (a transmission phase difference) between P-polarization and S-polarization of light that passes through the dielectric multilayer film MLR is denoted D. Then, a relationship between $\delta$ and D should be as follows:

if δ=30 degrees, D is larger than or equal to 2 degrees but smaller than or equal to 20 degrees, and if δ=60 degrees, D is larger than or equal to 4 degrees but smaller than or equal to 40 degrees.

Further, a change of D within the range of 30 degrees≦δ≦60 degrees is a monotonous change (e.g., a linear change) as for the coated objective lens COL (corresponding to the Example 1 to the Example 6).

In addition, the coated objective lens COL can reduce the astigmatism component of wave aberration effectively and can realize the antireflection function if it satisfies the following conditions (corresponding to the Example 1 to the Example 3).

Condition (1): The astigmatism component of wave aberration generated by the objective lens OL without the dielectric film Li is 20 mλ rms or larger.

Condition (2): The dielectric multilayer film MLR formed on the coated objective lens COL has the low refractive index layer L, the medium refractive index layer M and the high refractive index layer H including total nine or more layers.

In addition, if the coated objective lens COL satisfies another conditions as follows, it can reduce the astigmatism component of wave aberration effectively and can realize the antireflection function (corresponding to the Example 1 to the Example 5).

Condition (3): The astigmatism component of wave aberration caused by the objective lens OL without the dielectric film Li is larger than or equal to 10 mλ rms but smaller than 20 mλ rms.

Condition (4): The dielectric multilayer film MLR has the low refractive index layer L, the medium refractive index layer M and the high refractive index layer H including total seven or more layers.

In addition, if the coated objective lens COL satisfies another conditions as follows, it can reduce the astigmatism component of wave aberration effectively and can realize the antireflection function (corresponding to the Example 1 to the Example 5).

Condition (5): The astigmatism component of wave aberration caused by the coated objective lens COL without the dielectric film Li is larger than or equal to 20 mλ rms.

Condition (6): The dielectric multilayer film MLR includes total seven or more layers of dielectric films Li and has a cyclic structure in which the low refractive index layers L and the high refractive index layers H are laminated alternately.

Condition (7): A difference of refractive index obtained by subtracting the refractive index $N_L$ of the low refractive index layer L from the refractive index $N_H$ of the high refractive index layer H is 0.5 or larger.

In addition, if the coated objective lens COL satisfies another conditions as follows, it can reduce the astigmatism component of wave aberration effectively and can realize the antireflection function (corresponding to the Example 1 to the Example 6).

Condition (8): The astigmatism component of wave aberration caused by the objective lens OL without the dielectric film Li is larger than or equal to 10 mλ rms but smaller than 20 mλ rms.

Condition (9): The dielectric multilayer film MLR includes total five or more layers of dielectric films Li and has a cyclic structure in which the low refractive index layers L and the high refractive index layers H are laminated alternately.

Condition (10): A difference of refractive index obtained by subtracting the refractive index $N_L$ of the low refractive index layer L from the refractive index $N_H$ Of the high refractive index layer H is 0.5 or larger.

Note that the objective lens OL manufactured by glass molding is apt to cause birefringence. In addition, birefringence is easily caused in particular if a value of the numerical aperture is larger, for example, if it is 0.6 or more. In addition, such birefringence is generated radially with the center of the lens axis, and quantity of the birefringence increases as being close to the outer edge of the objective lens OL.

However, the dielectric multilayer film MLR formed on the objective lens OL also generates the transmission phase difference D radially with the center of the lens axis corresponding to the birefringence due to the objective lens OL, and quantity of the phase difference increases as being close to the outer edge of the objective lens OL. Therefore, if the dielectric multilayer film MLR is provided to the objective lens OL, the dielectric multilayer film MLR can cancel the birefringence phase difference by the transmission phase difference D without a problem, so that the astigmatism component of wave aberration can be reduced.

Other Embodiments

Note that the present invention can be modified variously without limiting to the embodiment described above, within the scope of the present invention without deviating from the spirit thereof.

For example, although birefringence of the objective lens manufactured by glass molding is compensated by the dielectric multilayer film in the embodiment described above, it can be compensated by a lens made of resin, too. Therefore, the present invention is not limited to a material of the lens. In addition, it is not limited to an objective lens for an optical pickup device but can be a lens for an imaging lens or a projection lens or a lens that is used for measurement, without limiting to a usage thereof. Any lens that is used for any optical system can reduce deterioration of performance due to lens birefringence by generating transmission phase difference by the dielectric multilayer film MLR.

In addition, although the embodiment described above shows an example where birefringence phase difference can be canceled when the phase of S-polarization is lagging from the phase of P-polarization, the present invention is not limited to this structure. It is sufficient to generate the phase difference in accordance with birefringence of the lens. There is no problem even if distribution of birefringence is not axially symmetric. What is important is to reduce birefringence of a lens by utilizing the phase difference between the P-polarization and the S-polarization, which is included in the present invention.

In addition, the dielectric multilayer film MLR is exemplified as an optical multilayer film included in the coated objective lens COL in the above description. However, this should not be interpreted as a limitation. More specifically, a material other than the dielectric material can be used for forming the optical thin film, i.e., the optical multilayer film. In addition, the dielectric multilayer film MLR is also not limited to the antireflective film, and the method for forming the dielectric multilayer film MLR on the objective lens OL is also not limited.

The above description of the concrete embodiments, examples and the like is aimed at making the technical contents of the present invention. Therefore, the present invention should not be interpreted in a narrow sense with limiting to the concrete examples, but it can be embodied variously within the scope of the attached claims.

TABLE 1

EXAMPLE 1

| Layer | | Material | | Refractive Index | | thickness (nm) |
|---|---|---|---|---|---|---|
| Objective Lens | | Glass | | | 1.62280 | — |
| i | 1 | Dielectric | $Al_2O_3$ | M | 1.64 | 85 |
| | 2 | Layer | $MgF_2$ | L | 1.38 | 19.03 |
| | 3 | | H4 | H | 2.11 | 19.53 |
| | 4 | | $MgF_2$ | L | 1.38 | 41.83 |
| | 5 | | H4 | H | 2.11 | 32.45 |
| | 6 | | $MgF_2$ | L | 1.38 | 34.15 |
| | 7 | | H4 | H | 2.11 | 49.61 |
| | 8 | | $MgF_2$ | L | 1.38 | 18.82 |
| | 9 | | H4 | H | 2.11 | 69.91 |
| | 10 | | $MgF_2$ | L | 1.38 | 25.7 |
| | 11 | | H4 | H | 2.11 | 32.95 |
| | 12 | | $MgF_2$ | L | 1.38 | 114.21 |
| Air | | Air | | | 1.00 | — |

TABLE 2

EXAMPLE 2

| Layer | | Material | | Refractive Index | | thickness (nm) |
|---|---|---|---|---|---|---|
| Objective Lens | | Glass | | | 1.62280 | — |
| i | 1 | Dielectric | $Al_2O_3$ | M | 1.64 | 65 |
| | 2 | Layer | $TiO_2$ | H | 2.42 | 19.2 |
| | 3 | | $MgF_2$ | L | 1.38 | 31.51 |
| | 4 | | $TiO_2$ | H | 2.42 | 47.67 |
| | 5 | | $MgF_2$ | L | 1.38 | 15.4 |
| | 6 | | $TiO_2$ | H | 2.42 | 82.88 |
| | 7 | | $MgF_2$ | L | 1.38 | 21.55 |
| | 8 | | $TiO_2$ | H | 2.42 | 31.28 |
| | 9 | | $MgF_2$ | L | 1.38 | 106.92 |
| Air | | Air | | | 1.00 | — |

TABLE 3

EXAMPLE 3

| Layer | | Material | | Refractive Index | | thickness (nm) |
|---|---|---|---|---|---|---|
| Objective Lens | | Glass | | | 1.62280 | — |
| i | 1 | Dielectric | $Al_2O_3$ | M | 1.64 | 52.38 |
| | 2 | Layer | $MgF_2$ | L | 1.38 | 37.48 |
| | 3 | | H4 | H | 2.11 | 28.98 |
| | 4 | | $Al_2O_3$ | M | 1.64 | 39.97 |
| | 5 | | H4 | H | 2.11 | 40.79 |
| | 6 | | $MgF_2$ | L | 1.38 | 51.28 |
| | 7 | | H4 | H | 2.11 | 26.87 |
| | 8 | | $MgF_2$ | L | 1.38 | 86.92 |
| | 9 | | H4 | H | 2.11 | 8.08 |
| Air | | Air | | | 1.00 | — |

TABLE 4

EXAMPLE 4

| Layer | | Material | | Refractive Index | | thickness (nm) |
|---|---|---|---|---|---|---|
| Objective Lens | | Glass | | | 1.62280 | — |
| i | 1 | Dielectric | $Al_2O_3$ | M | 1.64 | 85 |
| | 2 | Layer | $MgF_2$ | L | 1.38 | 30.54 |
| | 3 | | H4 | H | 2.11 | 27.28 |
| | 4 | | $MgF_2$ | L | 1.38 | 47.13 |
| | 5 | | H4 | H | 2.11 | 26.29 |

TABLE 4-continued

EXAMPLE 4

| Layer | | Material | | Refractive Index | | thickness (nm) |
|---|---|---|---|---|---|---|
| | 6 | | $MgF_2$ | L | 1.38 | 87.75 |
| | 7 | | H4 | H | 2.11 | 10.74 |
| Air | | Air | | | 1.00 | — |

TABLE 5

EXAMPLE 5

| Layer | | Material | | Refractive Index | | thickness (nm) |
|---|---|---|---|---|---|---|
| Objective Lens | | Glass | | | 1.62280 | — |
| i | 1 | Dielectric | $Al_2O_3$ | M | 1.64 | 181.68 |
| | 2 | Layer | $MgF_2$ | L | 1.38 | 25.28 |
| | 3 | | H4 | H | 2.11 | 22.02 |
| | 4 | | $Al_2O_3$ | M | 1.64 | 46.37 |
| | 5 | | H4 | H | 2.11 | 131.51 |
| | 6 | | $MgF_2$ | L | 1.38 | 62.49 |
| | 7 | | H4 | H | 2.11 | 10.91 |
| Air | | Air | | | 1.00 | — |

TABLE 6

EXAMPLE 6

| Layer | | Material | | Refractive Index | | thickness (nm) |
|---|---|---|---|---|---|---|
| Objective Lens | | Glass | | | 1.62280 | — |
| i | 1 | Dielectric | M3 | M | 1.84 | 87.66 |
| | 2 | Layer | H4 | H | 2.11 | 35.33 |
| | 3 | | $MgF_2$ | L | 1.38 | 28.93 |
| | 4 | | H4 | H | 2.11 | 28.89 |
| | 5 | | $MgF_2$ | L | 1.38 | 124.79 |
| Air | | Air | | | 1.00 | — |

TABLE 7

COMPARISON EXAMPLE

| Layer | | Material | | Refractive Index | | thickness (nm) |
|---|---|---|---|---|---|---|
| Objective Lens | | Glass | | | 1.62280 | — |
| i | 1 | Dielectric | M3 | M | 1.84 | 67.93 |
| | 2 | Layer | $TiO_2$ | H | 2.42 | 103.22 |
| | 3 | | $MgF_2$ | L | 1.38 | 90.58 |
| Air | | Air | | | 1.00 | — |

TABLE 8

Figure 5:
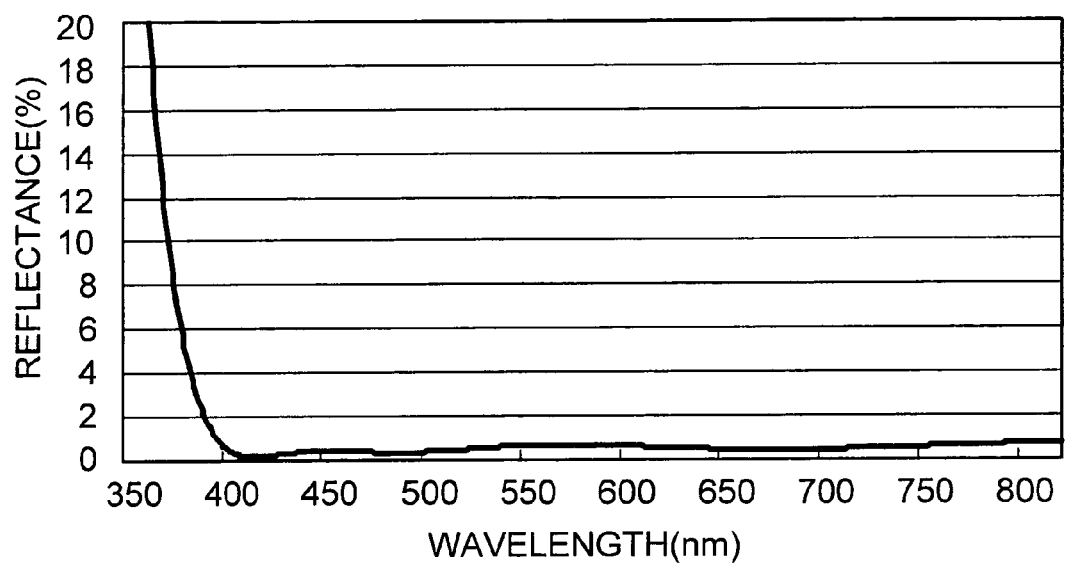
FIG. 5 is a reflection characteristic graph showing the reflection characteristic of a dielectric multilayer film according to an Example 1.
Figure 6:
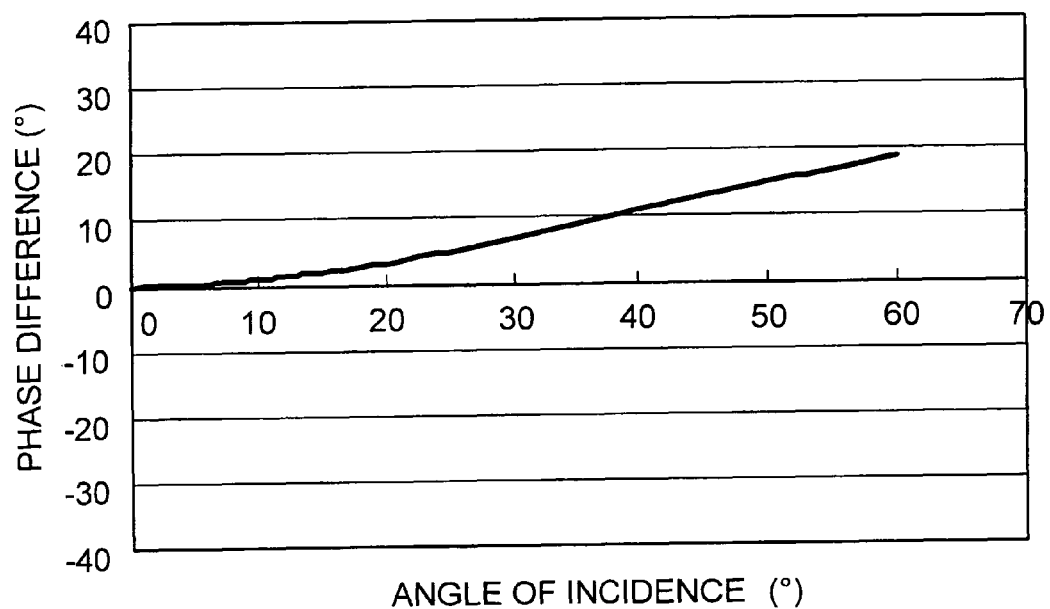
FIG. 6 is a phase difference characteristic graph showing the phase difference characteristic of a dielectric multilayer film according to the Example 1 (where, the wavelength is 405 nm).
Figure 7:
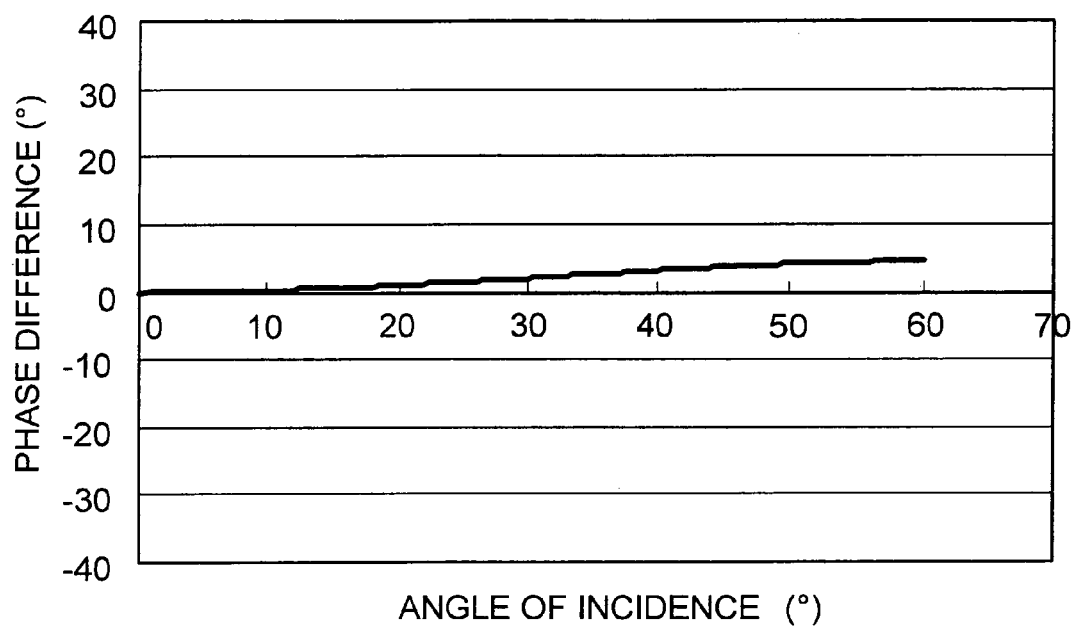
FIG. 7 is a phase difference characteristic graph showing the phase difference characteristic of the dielectric multilayer film according to the Example 1 (where, the wavelength is 660 nm).
Figure 8:
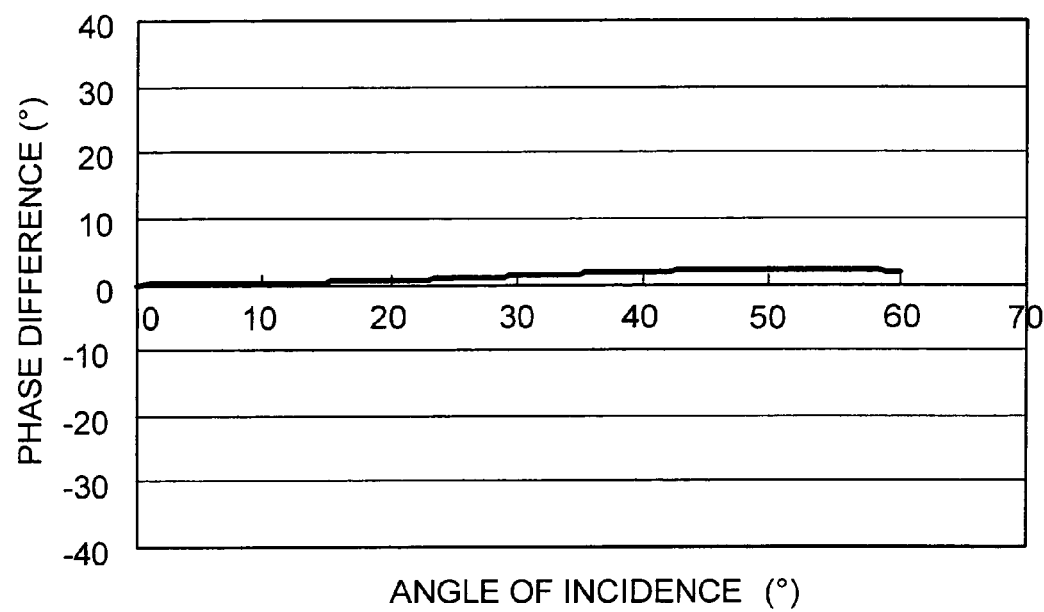
FIG. 8 is a phase difference characteristic graph showing the phase difference characteristic of the dielectric multilayer film according to the Example 1 (where, the wavelength is 785 nm)
Figure 9:
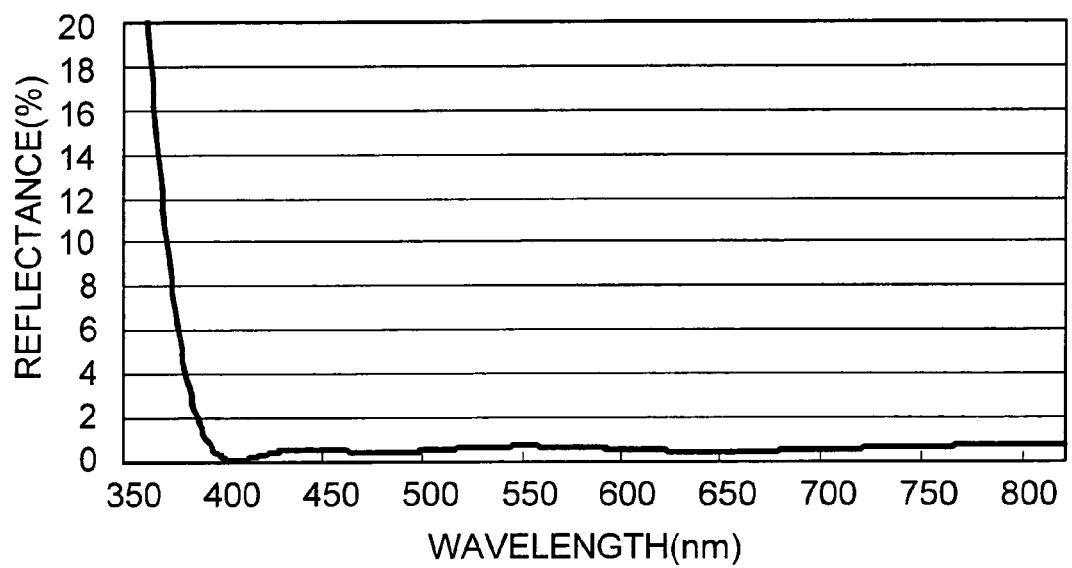
FIG. 9 is a reflection characteristic graph showing the reflection characteristic of a dielectric multilayer film according to an Example 2.
Figure 10:
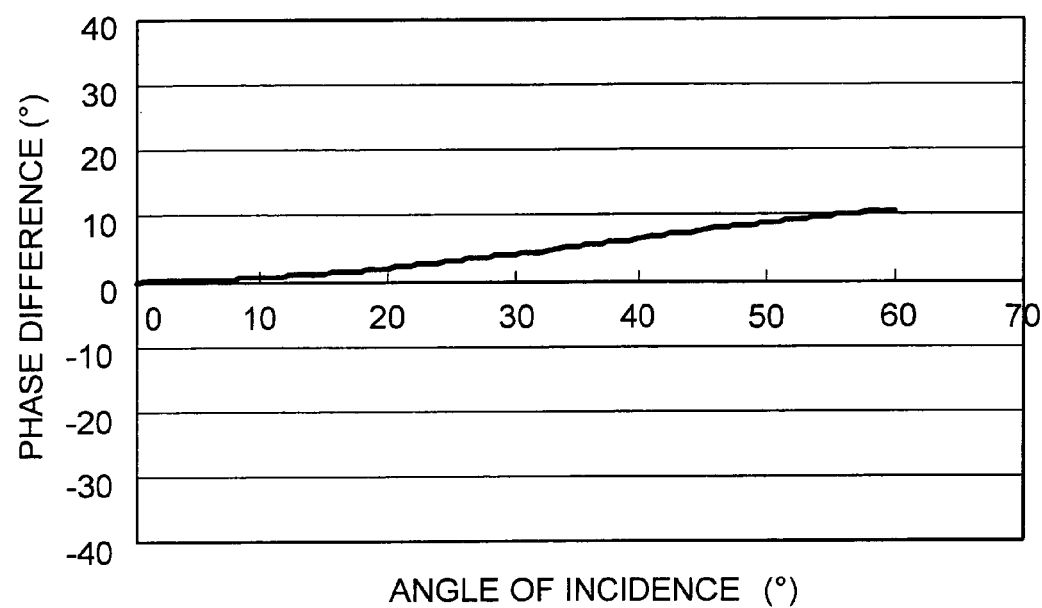
FIG. 10 is a phase difference characteristic graph showing the phase difference characteristic of the dielectric multilayer film according to the Example 2 (where, the wavelength is 405 nm).

|  |  | EXAMPLE 1 | EXAMPLE 2 | EXAMPLE 3 | EXAMPLE 4 | EXAMPLE 5 | EXAMPLE 6 | COMPARISON EXAMPLE |
|---|---|---|---|---|---|---|---|---|
| Reflection characteristic diagram | | FIG. 5 | FIG. 9 | FIG. 13 | FIG. 17 | FIG. 21 | FIG. 25 | FIG. 29 |
| Phase difference characteristic diagram | 405 nm | FIG. 6 | FIG. 10 | FIG. 14 | FIG. 18 | FIG. 22 | FIG. 26 | FIG. 30 |
| | 660 nm | FIG. 7 | FIG. 11 | FIG. 15 | FIG. 19 | FIG. 23 | FIG. 27 | FIG. 31 |
| | 785 nm | FIG. 8 | FIG. 12 | FIG. 16 | FIG. 20 | FIG. 24 | FIG. 28 | FIG. 32 |

What is claimed is:

1. An optical element having a lens and an optical multilayer film on a surface of the lens, wherein the lens has birefringence, and an astigmatism component of wave aberration caused by the lens is 10 m$\lambda$ rms or larger;

the optical multilayer film generates a phase difference between P-polarization and S-polarization, which cancels the birefringence, so that the astigmatism component of wave aberration caused by the optical element is reduced to 5 m$\lambda$ rms or smaller, wherein the phase difference of the optical multilayer film is increasing substantially and monotonously as being close to an outer edge portion from a center of the lens; and wherein when an angle of incidence of light entering the optical multilayer film is $\delta$ (degrees), and a phase difference between P-polarization and S-polarization of light passing through the optical multilayer film is D (degrees), a relationship between $\delta$ and D satisfies the following conditions at a wavelength of 405 nm:

if $\delta$=30 degrees, D is larger than or equal to 2 degrees but smaller than or equal to 20 degrees, and if $\delta$=60 degrees, D is larger than or equal to 4 degrees but smaller than or equal to 40 degrees; and a change of D within a range of 30 degrees$\leqq\delta\leqq$60 degrees is a monotonous change.

2. The optical element according to claim 1, wherein the monotonous change is a linear change.

3. The optical element according to claim 1, wherein the optical multilayer film is an antireflective film, and wherein the optical multilayer film comprises:

a low refractive index layer is an optical thin film having refractive index smaller than 1.6, a medium refractive index layer is an optical thin film having refractive index larger than or equal to 1.6 but smaller than or equal to 1.9, and a high refractive index layer is an optical thin film having refractive index larger than 1.9;

wherein the optical element satisfies Condition (1) and Condition (2) below:

Condition (1): the astigmatism component of the wave aberration of the lens is larger than or equal to 20 m$\lambda$ rms, and Condition (2): the optical multilayer film has the low refractive index layer, the medium refractive index layer and the high refractive index layer, including total nine or more layers.

4. The optical element according to claim 1, wherein the optical multilayer film is an antireflective film, and wherein the optical multilayer film comprises:

a low refractive index layer is an optical thin film having refractive index smaller than 1.6, a medium refractive index layer is an optical thin film having refractive index larger than or equal to 1.6 but smaller than or equal to 1.9, and a high refractive index layer is an optical thin film having refractive index larger than 1.9;

wherein the optical element satisfies Condition (1) and Condition (2) below:

Condition (1): the astigmatism component of the wave aberration of the lens is larger than or equal to 10 m$\lambda$ rms but smaller than 20 m$\lambda$ rms, and Condition (2): the optical multilayer film has the low refractive index layer, the medium refractive index layer and the high refractive index layer, including total seven or more layers.

5. The optical element according to claim 1, wherein the optical multilayer film is an antireflective film, and wherein the optical multilayer film comprises:

a low refractive index layer is an optical thin film having refractive index smaller than 1.6, and a high refractive index layer is an optical thin film having refractive index larger than 1.9;

wherein the optical element satisfies Condition (1) to the Condition (3) below:

Condition (1): the astigmatism component of the wave aberration of the lens is 20 m$\lambda$ rms or larger, Condition (2): the optical multilayer film includes total seven or more optical thin films and has a cyclic structure in which the low refractive index layers and the high refractive index layers are laminated alternately, and Condition (3): a difference of refractive index obtained by subtracting a refractive index of the low refractive index layer from a refractive index of the high refractive index layer is 0.5 or larger.

6. The optical element according to claim 1, wherein the optical multilayer film is an antireflective film, and wherein the optical multilayer film comprises:

a low refractive index layer is an optical thin film having refractive index smaller than 1.6, and a high refractive index layer is an optical thin film having refractive index larger than 1.9;

wherein the optical element satisfies Condition (1) to Condition (3) below:

Condition (1): the astigmatism component of the wave aberration of the lens is larger than or equal to 10 m$\lambda$ rms but smaller than 20 m$\lambda$ rms, Condition (2): the optical multilayer film includes total five or more optical thin films and has a cyclic structure in which the low refractive index layers and the high refractive index layers are laminated alternately, and Condition (3): a difference of refractive index obtained by subtracting a refractive index of the low refractive index layer from a refractive index of the high refractive index layer is 0.5 or larger.

7. The optical element according to claim 1, wherein the lens is formed by a molding process.

8. The optical element according to claim 1, wherein a numerical aperture of the lens is 0.6 or larger.

9. The optical element according to claim 1, wherein the birefringence is generated radially with a center of an axis of the lens, and quantity of the birefringence increases as being close to an outer edge of the lens from the center of the axis of the lens.

10. The optical element according to claim 1, wherein the optical multilayer film is a dielectric multilayer film in which dielectric films for antireflection are laminated.

11. An optical pickup device, comprising:

a light source that emits a laser beam, and a coated objective lens that condenses the laser beam onto an optical disc, wherein the coated objective lens has a lens and an optical multilayer film formed on a surface of the lens, the lens has birefringence, an astigmatism component of wave aberration due to the lens is larger than or equal to 10 m$\lambda$ rms, and the optical multilayer film generates a phase difference between P-polarization and S-polarization, which cancels the birefringence, so that the astigmatism component of wave aberration caused by the optical element is reduced to 5 m$\lambda$ rms or smaller wherein the phase difference of the optical multilayer film is increasing substantially and monotonously as being close to an outer edge portion from a center of the lens; and wherein when an angle of incidence of light entering the optical multilayer film is $\delta$ (degrees), and a phase difference between P-polarization and S-polarization of light passing through the optical multilayer film is D (degrees), a relationship between $\delta$ and D satisfies the following conditions at a wavelength of 405 nm:

if $\delta$=30 degrees, D is larger than or equal to 2 degrees but smaller than or equal to 20 degrees, and if $\delta$=60 degrees, D is larger than or equal to 4 degrees but smaller than or equal to 40 degrees; and a change of D within a range of 30 degrees$\leqq\delta\leqq$60 degrees is a monotonous change.

* * * * *